United States Patent
Appleby et al.

(10) Patent No.: US 8,813,824 B2
(45) Date of Patent: Aug. 26, 2014

(54) SYSTEMS, DEVICES, AND/OR METHODS FOR PRODUCING HOLES

(71) Applicants: Michael Appleby, Crozet, VA (US); John Paulus, Afton, VA (US); Iain Fraser, Ruckersville, VA (US); Jill Klinger, Charlottesville, VA (US); Benjamin Heneveld, Newmarket, NH (US)

(72) Inventors: Michael Appleby, Crozet, VA (US); John Paulus, Afton, VA (US); Iain Fraser, Ruckersville, VA (US); Jill Klinger, Charlottesville, VA (US); Benjamin Heneveld, Newmarket, NH (US)

(73) Assignee: Mikro Systems, Inc., Charlottesville, VA (US)

( * ) Notice: Subject to any disclaimer, the term of this patent is extended or adjusted under 35 U.S.C. 154(b) by 0 days.

(21) Appl. No.: 13/705,671

(22) Filed: Dec. 5, 2012

(65) Prior Publication Data
US 2013/0139990 A1 Jun. 6, 2013

Related U.S. Application Data

(60) Provisional application No. 61/567,259, filed on Dec. 6, 2011.

(51) Int. Cl.
| | | |
|---|---|---|
| B22C 9/10 | (2006.01) | |
| B22C 9/02 | (2006.01) | |
| B22D 25/02 | (2006.01) | |
| F01D 5/28 | (2006.01) | |
| B22C 9/24 | (2006.01) | |
| B22C 9/04 | (2006.01) | |
| F01D 5/18 | (2006.01) | |
| B22C 9/22 | (2006.01) | |
| F01D 5/14 | (2006.01) | |

(52) U.S. Cl.
CPC ............. *B22C 9/22* (2013.01); *Y02T 50/672* (2013.01); *B22C 9/02* (2013.01); *B22D 25/02* (2013.01); *F01D 5/284* (2013.01); *B22C 9/10* (2013.01); *B22C 9/24* (2013.01); *B22C 9/04* (2013.01); *F01D 5/18* (2013.01); *Y02T 50/673* (2013.01); *F01D 5/282* (2013.01); *F01D 5/147* (2013.01); *Y02T 50/676* (2013.01)
USPC ........................ 164/369; 164/137; 164/47

(58) Field of Classification Search
USPC .......... 164/369, 397, 398, 370, 45; 416/97 R
See application file for complete search history.

(56) References Cited

U.S. PATENT DOCUMENTS

| 408,677 A | 8/1889 | Tabor |
|---|---|---|
| 460,377 A | 9/1891 | Lake |

(Continued)

FOREIGN PATENT DOCUMENTS

| CA | 2448736 | 8/2010 |
|---|---|---|
| EP | 0273181 | 7/1988 |

(Continued)

OTHER PUBLICATIONS

Chemistry Encyclopedia, "Composition of Ceramics", Feb. 15, 2011, 6 pages, Accessed Feb. 15, 2011 from http://www.chemistryexplained.com/Bo-Ce/Ceramics.html.

(Continued)

*Primary Examiner* — Keith Walker
*Assistant Examiner* — Kevin E Yoon
(74) *Attorney, Agent, or Firm* — Michael Haynes PLC; Michael N. Haynes

(57) ABSTRACT

Certain exemplary embodiments can provide a system, machine, device, manufacture, circuit, and/or composition of matter adapted for and/or resulting from, and/or a method for activities that can comprise and/or relate to, a first form comprising: a plurality of surface artifacts that substantially spatially replicate a surface geometry of a stacked foil mold; and a prong that is adapted to form a hole in a cast product.

51 Claims, 30 Drawing Sheets

(56) References Cited

U.S. PATENT DOCUMENTS

| | | | |
|---|---|---|---|
| 1,164,987 A | 12/1915 | Bucky | |
| 2,679,172 A | 3/1951 | Clevenger | |
| 2,903,390 A | 9/1959 | Kojima | |
| 2,961,751 A | 11/1960 | Operhall | |
| 3,312,583 A | 4/1967 | Rochlis | |
| 3,379,812 A | 4/1968 | Yakovou | |
| 3,676,541 A | 7/1972 | Nishi | |
| 3,829,536 A | 8/1974 | Alvarez | |
| 3,889,921 A | 6/1975 | Weber | |
| 3,950,651 A | 4/1976 | Flocee | |
| 3,957,715 A | 5/1976 | Lirones | |
| 3,964,534 A | 6/1976 | Rabinowitz | |
| 3,988,586 A | 10/1976 | Stuart | |
| 3,988,589 A | 10/1976 | Leask | |
| 4,001,069 A | 1/1977 | DiMatteo | |
| 4,012,549 A | 3/1977 | Slysh | |
| 4,054,800 A | 10/1977 | Leask | |
| 4,075,483 A | 2/1978 | Tancrell | |
| 4,091,289 A | 5/1978 | LeMay | |
| 4,190,450 A | 2/1980 | Robb | |
| 4,273,178 A | 6/1981 | Goloff | |
| 4,284,121 A | 8/1981 | Horton | |
| 4,288,697 A | 9/1981 | Albert | |
| 4,317,036 A | 2/1982 | Wang | |
| 4,355,400 A | 10/1982 | Doemer et al. | |
| 4,356,400 A | 10/1982 | Polizzi | |
| 4,460,832 A | 7/1984 | Bigham | |
| 4,465,540 A | 8/1984 | Albert | |
| 4,534,813 A | 8/1985 | Williamson | |
| 4,641,270 A | 2/1987 | Lalloz | |
| 4,708,626 A | 11/1987 | Sakai | |
| 4,748,328 A | 5/1988 | Chang et al. | |
| 4,752,352 A | 6/1988 | Feygin | |
| 4,801,379 A | 1/1989 | Ehrsam et al. | |
| 4,812,236 A | 3/1989 | Ehrsam | |
| 4,825,646 A | 5/1989 | Challoner et al. | |
| 4,837,187 A | 6/1989 | Frank | |
| 4,856,043 A | 8/1989 | Zola | |
| 4,868,843 A | 9/1989 | Nunan | |
| 4,915,757 A | 4/1990 | Rando | |
| 4,951,305 A | 8/1990 | Moore et al. | |
| 5,002,889 A | 3/1991 | Klein | |
| 5,017,317 A | 5/1991 | Marcus | |
| 5,031,483 A | 7/1991 | Weaver | |
| 5,043,043 A | 8/1991 | Howe et al. | |
| 5,088,047 A | 2/1992 | Bynum | |
| 5,126,529 A | 6/1992 | Weiss | |
| 5,127,037 A | 6/1992 | Bynum | |
| 5,147,761 A | 9/1992 | Wessells et al. | |
| 5,150,183 A | 9/1992 | Mikosch | |
| 5,183,598 A | 2/1993 | Hellé | |
| 5,190,637 A | 3/1993 | Guckel | |
| 5,192,559 A | 3/1993 | Hull | |
| 5,198,680 A | 3/1993 | Kurakake | |
| 5,203,944 A | 4/1993 | Prinz | |
| 5,206,983 A | 5/1993 | Guckel et al. | |
| 5,207,371 A | 5/1993 | Prinz | |
| 5,208,431 A | 5/1993 | Uchiyama | |
| 5,216,616 A | 6/1993 | Masters | |
| 5,252,881 A | 10/1993 | Muller et al. | |
| 5,260,009 A | 11/1993 | Penn | |
| 5,286,573 A | 2/1994 | Prinz | |
| 5,301,863 A | 4/1994 | Prinz | |
| 5,303,459 A | 4/1994 | Kurakake | |
| 5,306,447 A | 4/1994 | Marcus | |
| 5,319,014 A | 6/1994 | Moorman | |
| 5,335,255 A | 8/1994 | Seppi | |
| 5,340,512 A | 8/1994 | Slocum | |
| 5,348,693 A | 9/1994 | Taylor | |
| 5,378,583 A | 1/1995 | Guckel et al. | |
| 5,384,339 A | 1/1995 | Starkey | |
| 5,394,932 A | 3/1995 | Carozza | |
| 5,398,193 A | 3/1995 | deAngelis | |
| 5,447,068 A | 9/1995 | Tang | |
| 5,450,183 A | 9/1995 | O'Leary | |
| 5,450,751 A | 9/1995 | Putty et al. | |
| 5,459,320 A | 10/1995 | Danet et al. | |
| 5,479,981 A | 1/1996 | Kim | |
| 5,483,387 A | 1/1996 | Bauhahn et al. | |
| 5,512,754 A | 4/1996 | Enos | |
| 5,514,232 A | 5/1996 | Burns | |
| 5,531,568 A | 7/1996 | Broadhead | |
| 5,551,904 A | 9/1996 | Hedges et al. | |
| 5,555,481 A | 9/1996 | Rock | |
| 5,559,708 A | 9/1996 | Turnbull | |
| 5,576,147 A | 11/1996 | Guckel et al. | |
| 5,581,592 A | 12/1996 | Zarnoch | |
| 5,596,504 A | 1/1997 | Tata | |
| 5,606,589 A | 2/1997 | Pellegrino et al. | |
| 5,620,854 A | 4/1997 | Holzrichter et al. | |
| 5,637,169 A | 6/1997 | Hull | |
| 5,638,212 A | 6/1997 | Meyers et al. | |
| 5,644,177 A | 7/1997 | Guckel et al. | |
| 5,681,661 A | 10/1997 | Kelly | |
| 5,692,507 A | 12/1997 | Seppi et al. | |
| 5,702,384 A | 12/1997 | Umeyama et al. | |
| 5,712,435 A * | 1/1998 | Feagin | 75/230 |
| 5,717,213 A | 2/1998 | Stoub | |
| 5,718,618 A | 2/1998 | Guckel et al. | |
| 5,721,687 A | 2/1998 | Lamartine et al. | |
| 5,729,585 A | 3/1998 | Pellegrino et al. | |
| 5,751,000 A | 5/1998 | McCroskey | |
| 5,763,318 A | 6/1998 | Bertin et al. | |
| 5,773,116 A | 6/1998 | Lamartine et al. | |
| 5,778,468 A | 7/1998 | Saarela et al. | |
| 5,786,597 A | 7/1998 | Lingren et al. | |
| 5,795,748 A | 8/1998 | Cottingham | |
| 5,799,057 A | 8/1998 | Hoffman | |
| 5,812,629 A | 9/1998 | Clauser | |
| 5,814,235 A | 9/1998 | Pellegrino et al. | |
| 5,814,807 A | 9/1998 | Musha et al. | |
| 5,836,150 A | 11/1998 | Garcia | |
| 5,847,958 A | 12/1998 | Shaikh | |
| 5,849,229 A | 12/1998 | Holtzberg | |
| 5,851,897 A | 12/1998 | Wu | |
| 5,855,718 A | 1/1999 | Nguyen | |
| 5,875,527 A | 3/1999 | Lacey | |
| 5,879,489 A | 3/1999 | Burns | |
| 5,900,350 A | 5/1999 | Provost | |
| 5,902,538 A | 5/1999 | Kruger | |
| 5,924,277 A | 7/1999 | Beattie et al. | |
| 5,925,308 A | 7/1999 | Fewkes | |
| 5,929,446 A | 7/1999 | Plummer et al. | |
| 5,932,940 A | 8/1999 | Epstein et al. | |
| 5,945,131 A | 8/1999 | Harvey | |
| 5,947,181 A * | 9/1999 | Davis | 164/132 |
| 5,949,850 A | 9/1999 | Tang | |
| 5,955,801 A | 9/1999 | Romero et al. | |
| 5,955,818 A | 9/1999 | Bertin et al. | |
| 5,961,458 A | 10/1999 | Carroll | |
| 5,962,949 A | 10/1999 | Dhuler et al. | |
| 5,963,788 A | 10/1999 | Barron et al. | |
| 5,985,204 A | 11/1999 | Otsuka et al. | |
| 5,994,801 A | 11/1999 | Garcia | |
| 5,994,816 A | 11/1999 | Dhuler et al. | |
| 5,998,260 A | 12/1999 | Lin | |
| 6,004,500 A | 12/1999 | Safari et al. | |
| 6,007,765 A | 12/1999 | Oversberg | |
| 6,011,265 A | 1/2000 | Sauli | |
| 6,014,419 A | 1/2000 | Hu | |
| 6,017,410 A | 1/2000 | Baccini | |
| 6,018,422 A | 1/2000 | Feldman | |
| 6,018,566 A | 1/2000 | Eberhard | |
| 6,018,680 A | 1/2000 | Flower | |
| 6,021,358 A | 2/2000 | Sachs | |
| 6,039,556 A | 3/2000 | Jens | |
| 6,055,899 A | 5/2000 | Feit et al. | |
| 6,068,684 A | 5/2000 | Overton | |
| 6,075,840 A | 6/2000 | Pellegrino et al. | |
| 6,084,626 A | 7/2000 | Ramanujan et al. | |
| 6,084,980 A | 7/2000 | Nguyen | |
| 6,088,102 A | 7/2000 | Manhart | |
| 6,099,289 A | 8/2000 | Jens | |
| 6,124,663 A | 9/2000 | Haake et al. | |

(56) References Cited

U.S. PATENT DOCUMENTS

| | | |
|---|---|---|
| 6,126,775 A | 10/2000 | Cullen |
| 6,133,670 A | 10/2000 | Rodgers et al. |
| 6,134,294 A | 10/2000 | Gibbs |
| 6,134,301 A | 10/2000 | Mruzek |
| 6,143,293 A | 11/2000 | Weiss |
| 6,149,160 A | 11/2000 | Stephens et al. |
| 6,152,181 A | 11/2000 | Wapner |
| 6,155,634 A | 12/2000 | Oehlerking et al. |
| 6,159,407 A | 12/2000 | Krinke |
| 6,162,040 A | 12/2000 | Clune |
| 6,163,939 A | 12/2000 | Lacey |
| 6,165,406 A | 12/2000 | Jang |
| 6,172,364 B1 | 1/2001 | Ogasawara |
| 6,175,615 B1 | 1/2001 | Guru et al. |
| 6,179,601 B1 | 1/2001 | Kruger |
| 6,185,278 B1 | 2/2001 | Appleby et al. |
| 6,188,743 B1 | 2/2001 | Tybinkowski et al. |
| 6,190,594 B1 | 2/2001 | Gorman |
| 6,193,923 B1 | 2/2001 | Leyden |
| 6,197,180 B1 | 3/2001 | Kelly |
| 6,206,679 B1 | 3/2001 | Provost |
| 6,210,644 B1 | 4/2001 | Trokhan et al. |
| 6,219,015 B1 | 4/2001 | Bloom et al. |
| 6,224,807 B1 | 5/2001 | Clune |
| 6,226,120 B1 | 5/2001 | Feldman |
| 6,230,408 B1 | 5/2001 | Ehrfeld |
| 6,241,934 B1 | 6/2001 | Everett |
| 6,242,163 B1 | 6/2001 | Stampfl et al. |
| 6,245,184 B1 | 6/2001 | Riedner |
| 6,245,249 B1 | 6/2001 | Yamada |
| 6,245,487 B1 | 6/2001 | Randall |
| 6,245,849 B1 | 6/2001 | Morales et al. |
| 6,248,419 B1 | 6/2001 | Kennedy |
| 6,250,070 B1 | 6/2001 | Kreiner et al. |
| 6,252,938 B1 | 6/2001 | Tang |
| 6,258,311 B1 | 7/2001 | Jens |
| 6,261,066 B1 | 7/2001 | Linnemann et al. |
| 6,261,506 B1 | 7/2001 | Nguyen |
| 6,270,335 B2 | 8/2001 | Leyden |
| 6,276,313 B1 | 8/2001 | Yang et al. |
| 6,280,090 B1 | 8/2001 | Stephens et al. |
| 6,285,739 B1 | 9/2001 | Rudin |
| 6,286,289 B1 | 9/2001 | Powell |
| 6,299,300 B1 | 10/2001 | Silverbrook |
| 6,304,626 B1 | 10/2001 | Adachi |
| 6,307,815 B1 | 10/2001 | Polosky et al. |
| 6,310,419 B1 | 10/2001 | Wood |
| 6,314,887 B1 | 11/2001 | Robinson |
| 6,318,069 B1 | 11/2001 | Falce et al. |
| 6,318,849 B1 | 11/2001 | Silverbrook |
| 6,324,259 B1 | 11/2001 | Lehmann |
| 6,324,748 B1 | 12/2001 | Dhuler et al. |
| 6,328,903 B1 | 12/2001 | Vernon, Sr. |
| 6,333,584 B1 | 12/2001 | Jerman et al. |
| 6,336,318 B1 | 1/2002 | Falce et al. |
| 6,338,199 B1 | 1/2002 | Chigira et al. |
| 6,338,249 B1 | 1/2002 | Pai |
| 6,340,222 B1 | 1/2002 | Silverbrook |
| 6,344,392 B1 | 2/2002 | Liaw |
| 6,346,030 B1 | 2/2002 | Morales |
| 6,350,983 B1 | 2/2002 | Kaldor et al. |
| 6,352,656 B1 | 3/2002 | Kimura |
| 6,360,424 B1 | 3/2002 | Mehregany et al. |
| 6,363,712 B1 | 4/2002 | Sniegowski et al. |
| 6,363,843 B1 | 4/2002 | Daniel et al. |
| 6,365,900 B1 | 4/2002 | Mestais |
| 6,366,643 B1 | 4/2002 | Davis |
| 6,367,911 B1 | 4/2002 | Windel et al. |
| 6,373,158 B1 | 4/2002 | Hsu et al. |
| 6,373,919 B1 | 4/2002 | Horiuchi |
| 6,375,871 B1 | 4/2002 | Bentsen et al. |
| 6,375,880 B1 | 4/2002 | Cooper |
| 6,376,148 B1 | 4/2002 | Liu |
| 6,381,846 B2 | 5/2002 | Insley et al. |
| 6,382,588 B1 | 5/2002 | Hierold |
| 6,383,601 B2 | 5/2002 | Prins |
| 6,386,015 B1 | 5/2002 | Rader et al. |
| 6,387,305 B1 | 5/2002 | Jens |
| 6,387,713 B2 | 5/2002 | Hara |
| 6,392,187 B1 | 5/2002 | Johnson |
| 6,392,313 B1 | 5/2002 | Epstein et al. |
| 6,392,524 B1 | 5/2002 | Biegelsen et al. |
| 6,393,685 B1 | 5/2002 | Collins |
| 6,395,126 B1 | 5/2002 | Cullen |
| 6,396,677 B1 | 5/2002 | Chua et al. |
| 6,397,677 B1 | 6/2002 | Kinsley et al. |
| 6,397,793 B2 | 6/2002 | Yang et al. |
| 6,398,490 B1 | 6/2002 | Antonsson |
| 6,399,010 B1 | 6/2002 | Guertin |
| 6,401,004 B1 | 6/2002 | Yamazaki |
| 6,404,942 B1 | 6/2002 | Edwards et al. |
| 6,406,658 B1 | 6/2002 | Manners |
| 6,408,884 B1 | 6/2002 | Kamholz et al. |
| 6,409,072 B1 | 6/2002 | Breuer et al. |
| 6,410,213 B1 | 6/2002 | Raguin et al. |
| 6,411,672 B1 | 6/2002 | Sasaki |
| 6,415,860 B1 | 7/2002 | Kelly et al. |
| 6,416,168 B1 | 7/2002 | Silverbrook |
| 6,426,145 B1 | 7/2002 | Moroni |
| 6,433,657 B1 | 8/2002 | Chen |
| 6,438,210 B1 | 8/2002 | Castleberry |
| 6,440,284 B1 | 8/2002 | Dubrow |
| 6,445,840 B1 | 9/2002 | Fernandez et al. |
| 6,447,727 B1 | 9/2002 | Parce et al. |
| 6,450,047 B2 | 9/2002 | Swedberg et al. |
| 6,453,083 B1 | 9/2002 | Husain et al. |
| 6,454,945 B1 | 9/2002 | Weigl et al. |
| 6,457,629 B1 | 10/2002 | White |
| 6,458,263 B1 | 10/2002 | Morales et al. |
| 6,462,858 B1 | 10/2002 | MacDonald et al. |
| 6,463,115 B1 | 10/2002 | Horiuchi |
| 6,463,349 B2 | 10/2002 | White |
| 6,467,138 B1 | 10/2002 | Aime |
| 6,468,039 B1 | 10/2002 | Lehman |
| 6,471,471 B1 | 10/2002 | Bouyer |
| 6,471,800 B2 | 10/2002 | Jang |
| 6,472,459 B2 | 10/2002 | Morales et al. |
| 6,479,824 B1 | 11/2002 | Hoffman |
| 6,480,320 B1 | 11/2002 | Nasiri |
| 6,484,050 B1 | 11/2002 | Carroll |
| 6,490,496 B1 | 12/2002 | Dacey |
| 6,505,089 B1 | 1/2003 | Yang |
| 6,508,971 B2 | 1/2003 | Leyden et al. |
| 6,519,313 B2 | 2/2003 | Venkataramani |
| 6,519,500 B1 | 2/2003 | White |
| 6,524,507 B1 | 2/2003 | Clune |
| 6,543,099 B1 | 4/2003 | Filion |
| 6,557,607 B2 | 5/2003 | Yamada |
| 6,572,910 B2 | 6/2003 | Lanner |
| 6,575,218 B1 | 6/2003 | Burns |
| 6,588,484 B1 | 7/2003 | Fosaaen |
| 6,611,731 B2 | 8/2003 | Duffin |
| 6,612,811 B2 * | 9/2003 | Morgan et al. ............... 416/97 R |
| 6,613,438 B1 | 9/2003 | Hein |
| 6,615,899 B1 | 9/2003 | Woodward |
| 6,616,884 B1 | 9/2003 | Sorensen |
| 6,616,885 B2 | 9/2003 | Lombardi |
| 6,627,030 B2 | 9/2003 | Yang |
| 6,627,835 B1 | 9/2003 | Chung |
| 6,660,209 B2 | 12/2003 | Leyden |
| 6,663,810 B1 | 12/2003 | Lee |
| 6,682,684 B1 | 1/2004 | Jamalabad |
| 6,682,688 B1 | 1/2004 | Higashi |
| 6,713,199 B2 | 3/2004 | Girardie |
| 6,731,438 B2 | 5/2004 | Stern |
| 6,745,446 B1 | 6/2004 | Barlier |
| 6,780,368 B2 | 8/2004 | Liu |
| 6,784,433 B2 | 8/2004 | Zur |
| 6,812,061 B1 | 11/2004 | Feierabend |
| 6,829,536 B2 | 12/2004 | Moore |
| 6,839,408 B2 | 1/2005 | Tang |
| 6,881,950 B2 | 4/2005 | Schlaf |
| 6,987,836 B2 | 1/2006 | Tang |
| 7,057,245 B2 | 6/2006 | Feierabend |

(56) References Cited

U.S. PATENT DOCUMENTS

| | | |
|---|---|---|
| 7,074,358 B2 | 7/2006 | Gybin |
| 7,077,638 B2 | 7/2006 | Leyden |
| 7,097,729 B2 | 8/2006 | Barlier |
| 7,112,797 B2 | 9/2006 | Hoge |
| 7,141,080 B2 | 11/2006 | Feierabend |
| 7,141,812 B2 | 11/2006 | Appleby |
| 7,165,936 B2 | 1/2007 | Elpern |
| 7,170,140 B2 | 1/2007 | Dutoit |
| 7,203,569 B2 | 4/2007 | Liang |
| 7,235,166 B2 | 6/2007 | Cohen |
| 7,252,861 B2 | 8/2007 | Smalley |
| 7,371,046 B2 | 5/2008 | Lee |
| 7,410,606 B2 | 8/2008 | Appleby |
| 7,411,204 B2 | 8/2008 | Appleby |
| 7,413,001 B2 | 8/2008 | Wang |
| 7,462,852 B2 | 12/2008 | Appleby |
| 7,514,482 B2 | 4/2009 | Treadway |
| 7,518,136 B2 | 4/2009 | Appleby |
| 7,717,677 B1 | 5/2010 | Liang |
| 7,785,098 B1 | 8/2010 | Appleby |
| 7,866,950 B1 | 1/2011 | Wilson, Jr. |
| 7,893,413 B1 | 2/2011 | Appleby |
| 8,057,183 B1 | 11/2011 | Liang |
| 8,066,483 B1 | 11/2011 | Liang |
| 8,096,766 B1 | 1/2012 | Downs |
| 8,162,609 B1 | 4/2012 | Liang |
| 8,167,537 B1 | 5/2012 | Plank |
| 8,206,095 B2 | 6/2012 | Parker |
| 8,317,475 B1 | 11/2012 | Downs |
| 8,322,988 B1 | 12/2012 | Downs |
| 8,734,108 B1 | 5/2014 | Liang |
| 2001/0022416 A1 | 9/2001 | Harada |
| 2001/0031531 A1 | 10/2001 | Liaw |
| 2001/0034114 A1 | 10/2001 | Liaw |
| 2001/0038803 A1 | 11/2001 | Morales |
| 2002/0087073 A1 | 7/2002 | Hoffman |
| 2002/0093115 A1 | 7/2002 | Jang |
| 2002/0123683 A1 | 9/2002 | Hoffman |
| 2002/0149137 A1 | 10/2002 | Jang |
| 2002/0181647 A1 | 12/2002 | Venkataramani et al. |
| 2003/0004407 A1 | 1/2003 | Carroll |
| 2003/0023149 A1 | 1/2003 | Montemagno |
| 2003/0026386 A1 | 2/2003 | Tang |
| 2003/0057096 A1 | 3/2003 | Morales |
| 2003/0128812 A1 | 7/2003 | Appleby et al. |
| 2003/0128813 A1 | 7/2003 | Appleby et al. |
| 2003/0157347 A1 | 8/2003 | Zhang |
| 2003/0235272 A1 | 12/2003 | Appleby |
| 2004/0006405 A1 | 1/2004 | Chen |
| 2004/0086458 A1 | 5/2004 | Kohn |
| 2004/0120464 A1 | 6/2004 | Hoffman |
| 2004/0128016 A1 | 7/2004 | Stewart |
| 2004/0156478 A1 | 8/2004 | Appleby |
| 2004/0217291 A1 | 11/2004 | Hoge |
| 2004/0218713 A1 | 11/2004 | Hoffman |
| 2004/0227092 A1 | 11/2004 | Ratzmann |
| 2005/0131106 A1 | 6/2005 | Tonapi |
| 2005/0199166 A1 | 9/2005 | Kennedy |
| 2005/0206048 A1 | 9/2005 | Ryu |
| 2005/0269052 A1 | 12/2005 | Lynch |
| 2005/0281701 A1 | 12/2005 | Lynch |
| 2007/0036844 A1 | 2/2007 | Ma |
| 2007/0118212 A1 | 5/2007 | Hossainy |
| 2007/0158014 A1 | 7/2007 | Schwenn |
| 2008/0053638 A1 | 3/2008 | Appleby |
| 2008/0164001 A1* | 7/2008 | Morris et al. ............ 164/369 |
| 2008/0169081 A1 | 7/2008 | Frasier |
| 2008/0216983 A1 | 9/2008 | Whitton |
| 2008/0246180 A1 | 10/2008 | Appleby |
| 2009/0084933 A1 | 4/2009 | Appleby |
| 2009/0209745 A1 | 8/2009 | Zhao |
| 2009/0272874 A1 | 11/2009 | Appleby |
| 2010/0096778 A1 | 4/2010 | Appleby |
| 2011/0014474 A1 | 1/2011 | Appleby |
| 2011/0132562 A1 | 6/2011 | Merrill |
| 2011/0132564 A1 | 6/2011 | Merrill |
| 2011/0204205 A1 | 8/2011 | Kamel |
| 2012/0186082 A1 | 7/2012 | Tardif |

FOREIGN PATENT DOCUMENTS

| | | |
|---|---|---|
| EP | 0586153 | 3/1994 |
| EP | 0818256 | 1/1998 |
| EP | 1108518 | 6/2001 |
| EP | 1193721 | 4/2002 |
| EP | 1935532 | 6/2008 |
| JP | 60259420 | 12/1985 |
| JP | 01077890 | 3/1989 |
| JP | 02099260 A2 | 4/1990 |
| JP | 02212112 | 8/1990 |
| JP | 08230049 | 9/1996 |
| JP | 08276438 | 10/1996 |
| JP | 10109313 | 4/1998 |
| JP | 2001-162658 | 6/2001 |
| WO | WO02098624 | 12/2002 |
| WO | WO2008059272 | 5/2008 |
| WO | WO2010036801 | 4/2010 |

OTHER PUBLICATIONS

China Rare Metal Material Co., Ltd, ""Silicone wafer as metal foils"—Silicon (Si) Metal Products", Jan. 1, 2010, 2 pages, www.china-raremetal.com/product/Silicon-Si_%20metal.htm.

Desai, Upendra, "New Fabrication Methodology for Fine Feature High Aspect Ratio Structures Made from High Z Materials", Part of the SPIE Conference on Micromachining and Microfabrication Process Technology V, Sep. 22, 1999, 7 pages, vol. 3874, SPIE, US.

Hexcel Corporation, "HexWeb Honeycomb Attributes and Properties", Nov. 1, 1999, 39 pages, Hexcel Corporation.

Himmer, "Lamination of Metal Sheets", Jun. 1, 1999, Computers in Industry, Elsevier Science, V(39) No. 1.

Holton, "Semiconductor Device—from online Encyclopedia Britannica", Feb. 15, 2011, 3 pages, Accessed Feb. 15, 2011 from http://www.britannica.com/EBchecked/topic/533976/semiconductor-device.

Kessenikh, "Dependence of the Electrical Conductivity of an Epoxy Compound on Electric Field Intensity", Jan. 1, 1967, 3 pages, Izvestiya VUZ. Fizika, Soviet Physics Journal, vol. 10, No. 11.

Minco, "Investment Casting Product Data Sheet", Sep. 8, 2008, 1 page, Minco Inc.; Midway, TN.

Misiolek, "Rapid Prototyping of Extrusion Dies Using Layer-Based Techniques", Feb. 1, 1999, Journal of Materials Engineering and Performance, V8(1).

Newport Corporation, "Image of Isolator with Protruding Undercut—Faraday Optical Isolator, Free-Space", Jan. 1, 1996, 2 pages, www.newport.com.

Padalino, "CAD/CAM Systems and Their Integration in Mold Design", Oct. 1, 1996, Plastics Engineering V(52) 10.

Precision MetalSmiths, Inc., "Ten Most Asked Questions About Investment Casting", Sep. 25, 2008, 4 page(s), Precision Metalsmiths, Inc., Cleveland OH.

Walczyk, "Rapid Tooling for Sheet Metal Forming Using Profiled Edge Laminations-Design Principles and Demonstration", Nov. 1, 1998, Transactions of American Society of Mechanical Engineers, Series B: Journal of Engineering for Industry, V(120), 4.

Weck, "Fabrication of Microcomponents using Ultraprecision Machine Tools", Jan. 1, 1997, 4 pages, Nanotechnology, No. 8, 1997. IOP Publishing Ltd.

* cited by examiner

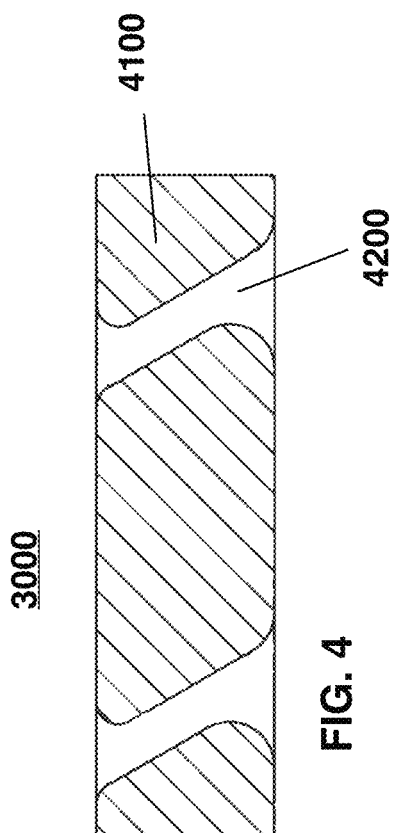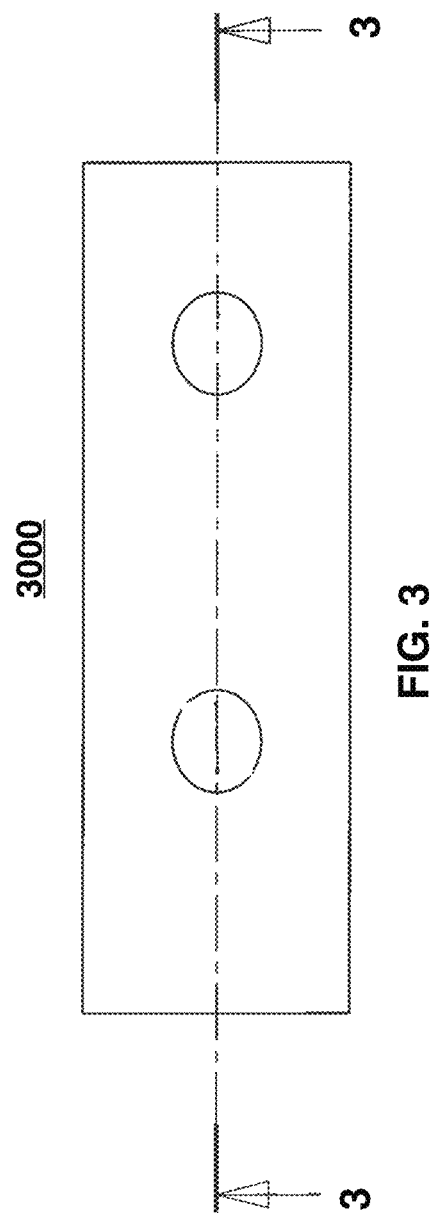

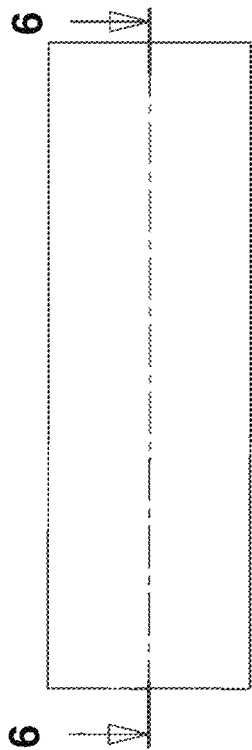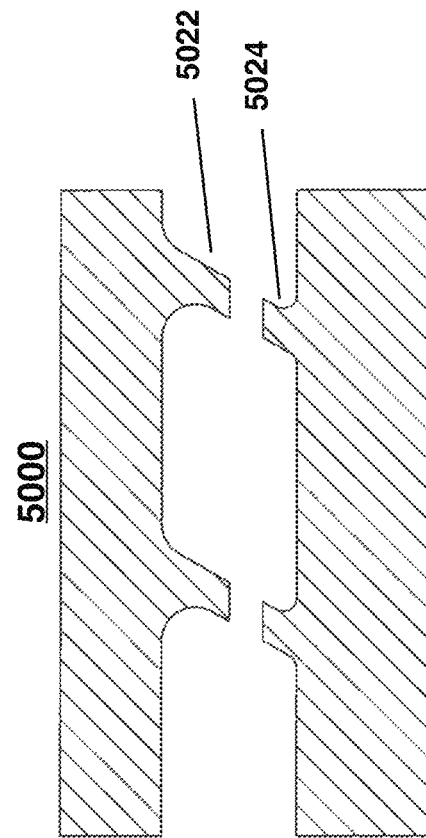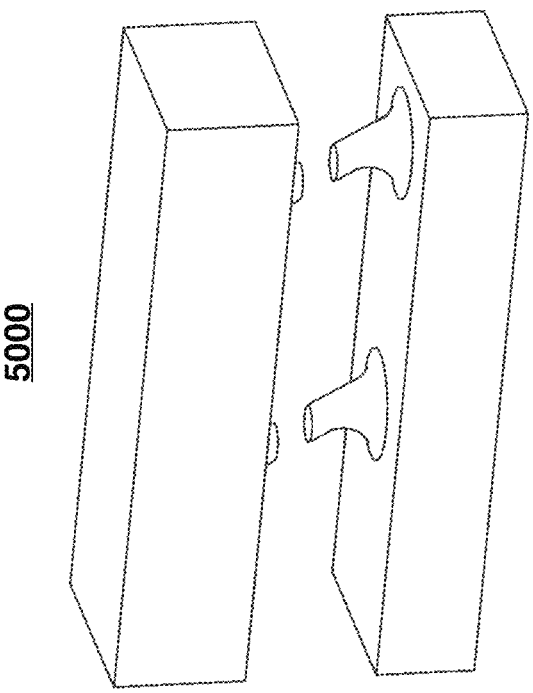

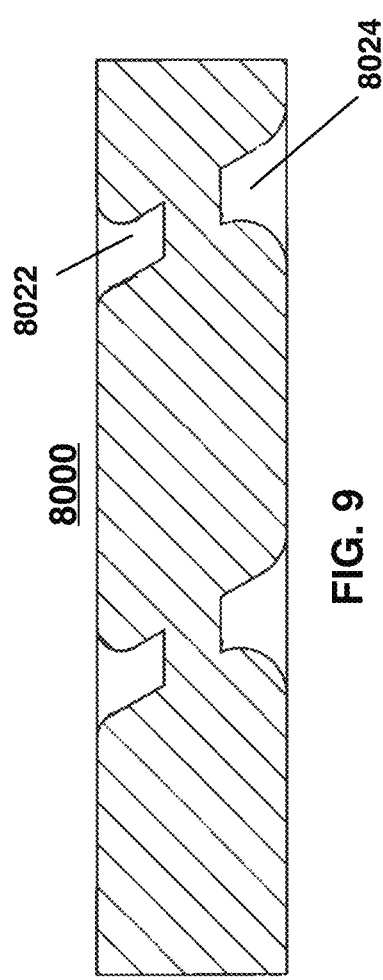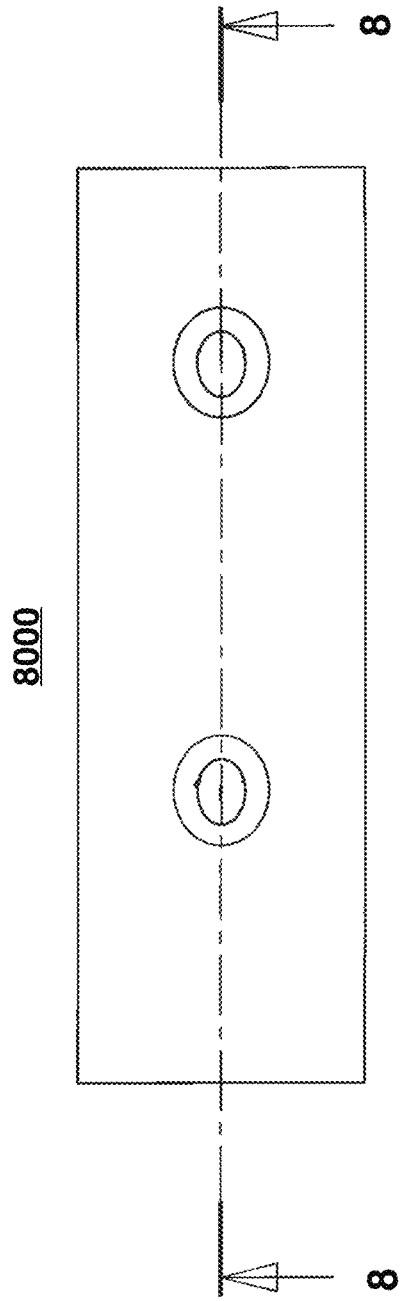

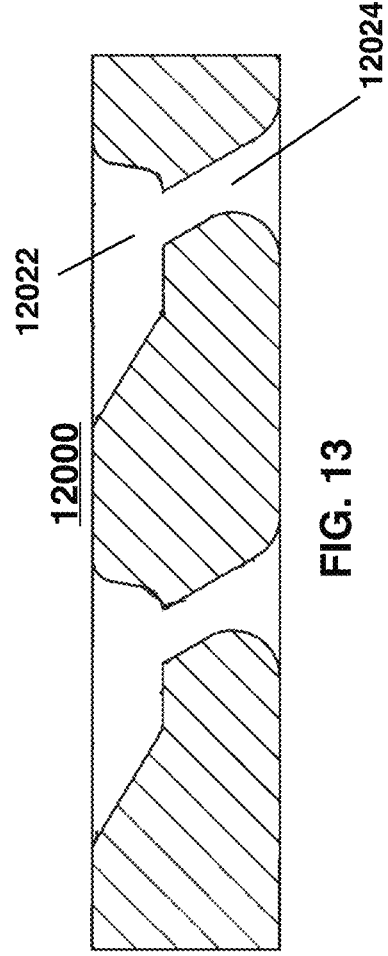
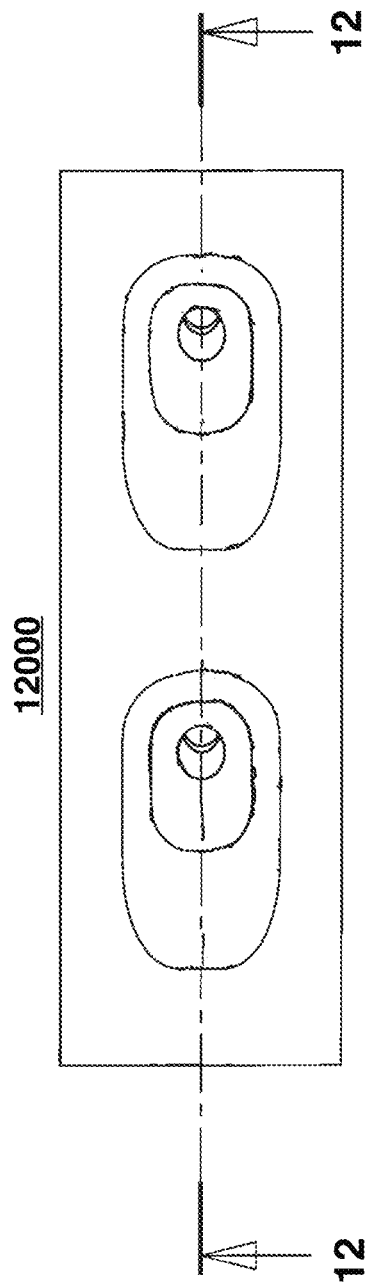

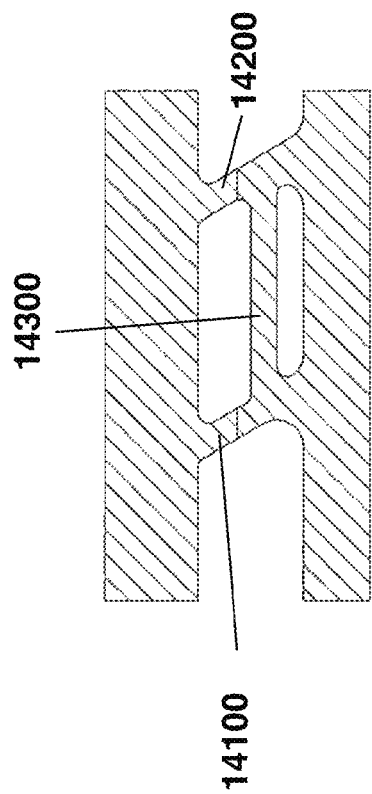
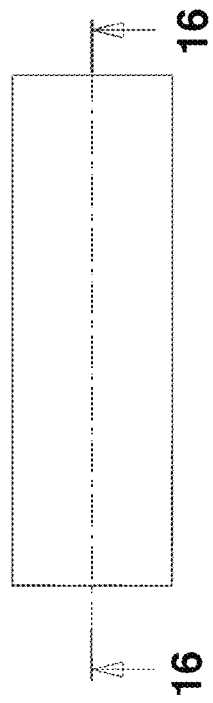
FIG. 17
FIG. 16
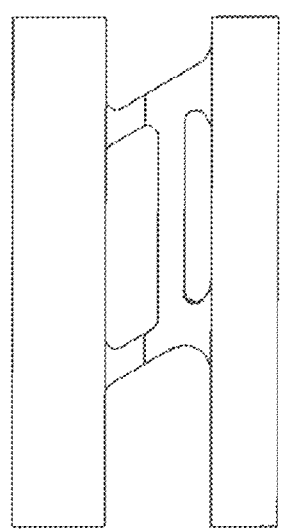
FIG. 15
FIG. 14

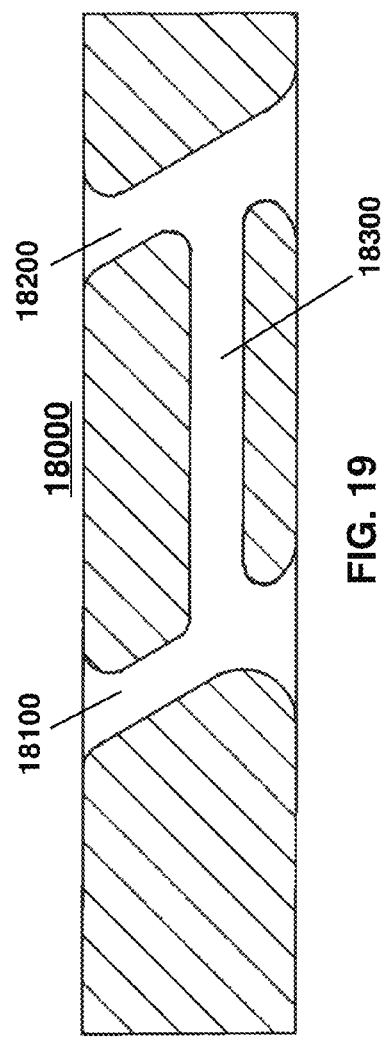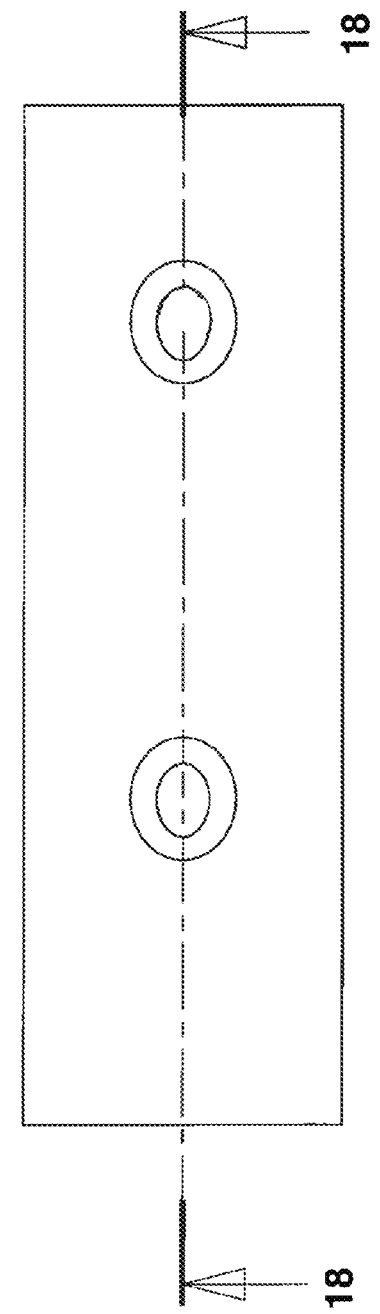

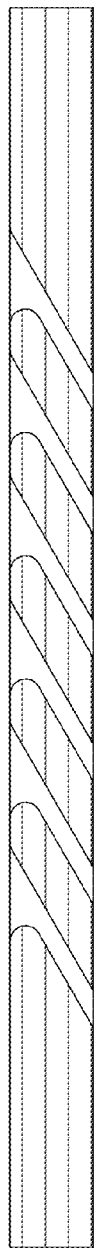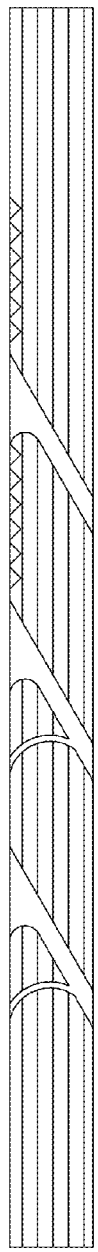

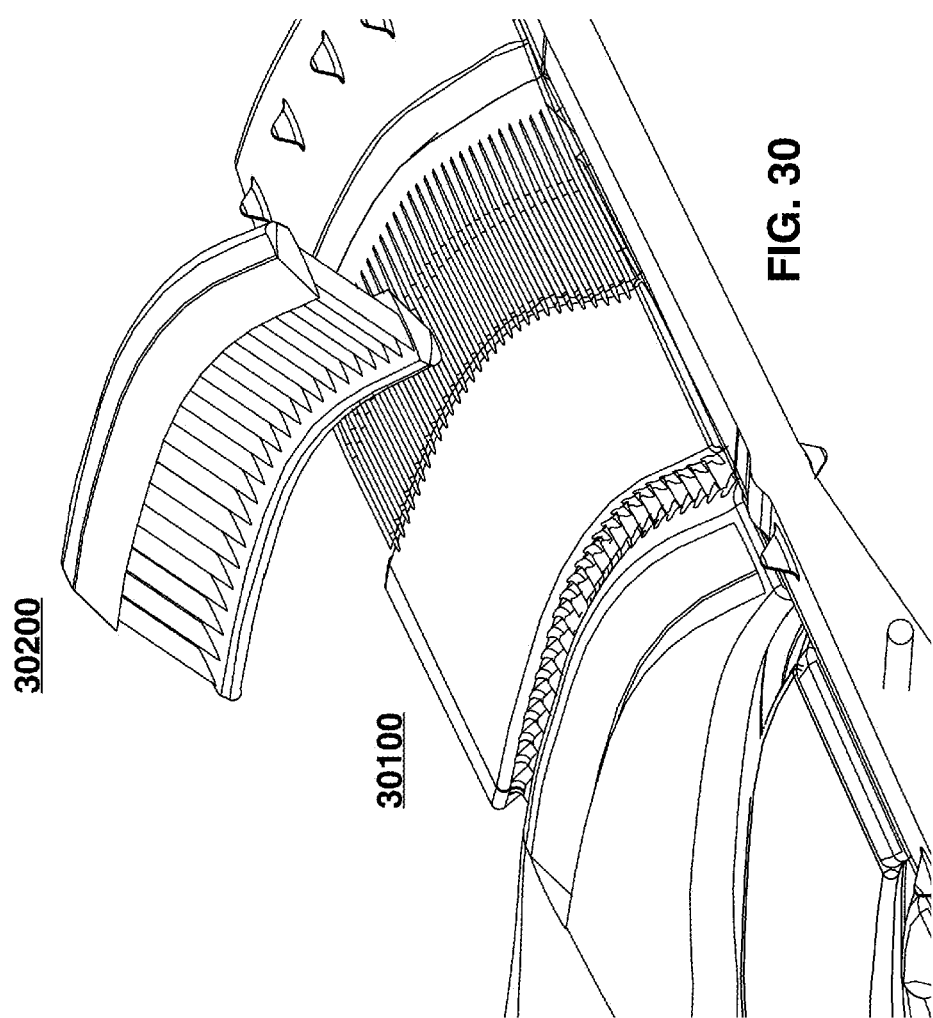

*Finish Machine includes, but is not limited to, the creation of film cooling holes TBC = Thermal Barrier Coating – a ceramic coating is applied to the metal cast blade to allow it to withstand higher temperatures

SYSTEMS, DEVICES, AND/OR METHODS FOR PRODUCING HOLES

CROSS-REFERENCE TO RELATED APPLICATIONS

This application claims priority to, and incorporates by reference herein in its entirety, U.S. Provisional Patent Application 61/567,259, filed 6 Dec. 2011.

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which:

FIG. 3 presents a top view of metallic structure 3000;

FIG. 4 presents a cross-sectional view, taken at section 3-3 of FIG. 3;

FIG. 5 presents an isometric view of an exemplary structure 5000;

FIG. 6 presents a top view of structure 5000;

FIG. 7 presents a cross-sectional view, taken at section 6-6 of FIG. 6;

FIG. 8 presents a top view of metallic structure 8000;

FIG. 9 presents a cross-sectional view, taken at section 8-8 of FIG. 8;

FIG. 12 presents a top view of metallic structure 12000;

FIG. 13 presents a cross-sectional view, taken at section 12-12 of FIG. 12;

FIG. 14 presents an isometric view of an exemplary structure 14000;

FIG. 15 presents a front view of exemplary structure 14000;

FIG. 16 presents a top view of exemplary structure 14000;

FIG. 17 presents a cross-sectional view, taken at section 16-16 of FIG. 16;

FIG. 18 presents a top view of metallic structure 18000;

FIG. 19 presents a cross-sectional view, taken at section 18-18 of FIG. 18;

FIGS. 24-29 present exemplary cross-sectional views of a plurality of exemplary holes in an exemplary metal casting (taken, e.g., at section 3-3 of FIG. 3);

FIG. 30 and FIG. 31 present isometric views of an exemplary base structure 30100;

DESCRIPTION

Figure 2:
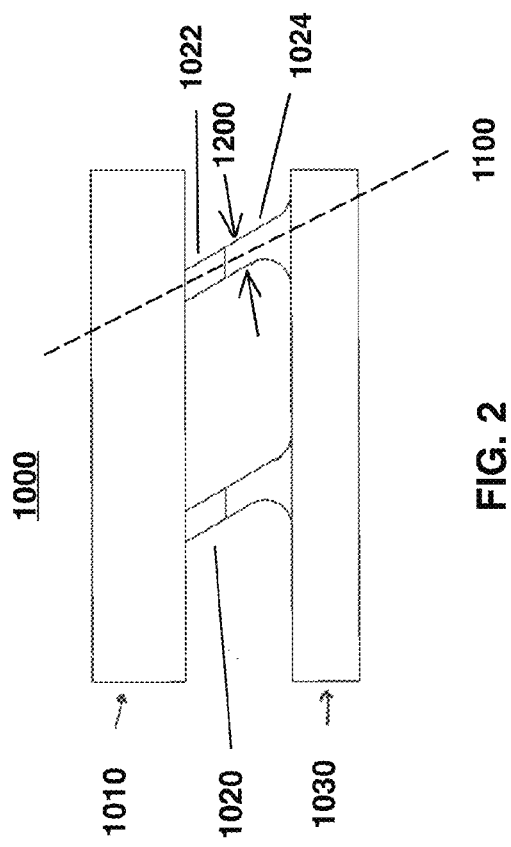
FIG. 2 presents a front view of exemplary structure 1000.

Certain exemplary embodiments can provide one or more systems, devices, and/or methods for producing desired holes in a manufactured object, such as during the manufacturing process. Such a manufacturing process can produce, potentially in high volume, complex, monolithic, and/or solid net-shape (i.e., formed to the designed configuration, no secondary finishing operations necessarily required), and/or micro-scale (i.e., with two or more orthogonal dimensions measuring in a range of approximately sub-micron to approximately 25 microns) to meso-scale (i.e., with two or more orthogonal dimensions measuring in a range of approximately 25 microns to approximately 100 millimeters) structures, such as from advanced materials comprised of, for example, powdered metals, metal alloys, ceramics, and/or polymers, etc. This process, which is described in U.S. Pat. No. 7,893,413 (which is incorporated by reference in its entirety), and which is sometimes referred to herein as Tomo-Lithographic-Molding (TLM™), can utilize a high-resolution master tool constructed from lithographically micro-machined layers, precisely aligned, stack laminated, and/or bonded. By combining dissimilarly patterned layers or "toma", 3D cavities of otherwise unattainable sophistication and/or precision can be created. Combining these disciplines with certain casting and/or forming methods can enable the production of cost effective, high aspect-ratio devices and/or systems with features ranging from micro-scale to meso-scale. Thousands of micro-scale and/or meso-scale features and/or structures in varied distributions and/or customized geometries can be arrayed upon large (e.g., approximately 1 square foot to approximately 10,000 square meters or larger) planar and/or non-planar, continuous and/or arrayed, surfaces. These surfaces may, in turn, be used as plies in a macro-scale (i.e., with one or more orthogonal dimensions measuring greater than 100 millimeters), laminate composite structure for potentially optimizing physical properties.

Exemplary structures manufactured by the TLM process can include components of rotating machines, such as turbines, turbine engines, compressors, pumps, etc., those components potentially including turbine blades, vanes, buckets, nozzles, shrouds, etc.

An object manufactured by the TLM process can include one or more desired holes, such as one or more through holes and/or blind holes. For example, in a turbine engine, many components, such as turbine blades or vanes, can be exposed to hot gases during engine operation. To withstand such hot gases, these components can be cooled during engine operation. To promote that cooling, these components can include a number of features, such as cooling channels, passages, and/or holes. Yet, the inclusion of such features can dramatically increase the difficulty of manufacturing the component using conventional techniques.

Turbine components can be formed via an investment casting process. For example, the production of an investment cast gas turbine blade or vane can involve producing a ceramic casting vessel having an outer ceramic shell with an inside surface corresponding to the desired outer "airfoil" shape of the blade or vane, and one or more ceramic cores positioned within the outer ceramic shell corresponding to interior cooling passages to be formed within the airfoil. In certain exemplary embodiments, as the ceramic casting vessel and/or one or more of its component parts are formed from one or more ceramic compositions, the ceramic composition of matter can undergo a partial and/or full crystal structure change, such as to cristobalite, e.g., from another distinct crystalline and/or amorphous form of silica (silicon dioxide or $SiO2$), such as $\alpha$-quartz, $\beta$-quartz, tridymite, coesite, seifertite, faujasite, melanophlogite, keatite, moganite, fibrous silica, stishovite, and/or quartz glass, etc. When the ceramic casting vessel is ready to create a casting, molten metallic alloy can be introduced into the ceramic casting vessel, allowed to cool, and thereby harden. In certain exemplary embodiments, as the metallic alloy casting cools from a molten state into a solid and/or non-molten state, its dimensions can shrink, causing the ceramic shell and/or core to fracture and/or substantially structurally disintegrate. The outer ceramic shell, ceramic core(s), and/or their disintegrated remains then can be removed by mechanical (e.g., shaking, blowing, washing, etc.) and/or chemical means to reveal cast part, e.g., the metallic cast blade or vane having the airfoil-like external shape resembling the interior shape of the ceramic shell and/or hollow interior cooling passages resembling the exterior shape of the ceramic core(s).

Prior to introducing the molten alloy, the ceramic core can be positioned within the two joined halves of a precision-machined hardened steel mold (sometimes referred to as the "wax mold"), which can define an injection volume that corresponds to the desired airfoil shape of the blade. Melted wax can be vacuum injected into the wax mold around the ceramic core. Once the wax has hardened, the wax mold halves can be separated and removed to reveal a "wax pattern", that is, a wax-coated ceramic core, with the outer surface of the wax pattern corresponding to the desired airfoil shape. That outer surface of the wax pattern then can be coated with a ceramic mold material, such as via a repeated dipping process, to form the ceramic shell around the wax pattern. Upon hardening of the shell and removal of the wax by melting, chemical dissolving, or the like, the completed ceramic casting vessel can be available to receive molten metallic alloy in the investment casting process, as described above.

The TLM process can be used to form the core(s), the wax mold, the wax pattern, and/or the outer ceramic shell. Likewise, the TLM process can be used to form the cooling holes in the airfoil in any of a number of manners. For example, one or more ceramic "prongs" can be formed as part of the core. Those prongs can extend toward and/or to the shell and/or the outer surface of the wax pattern, so that after hardening of the molten alloy and removal of the core (including its prongs), holes remain in the alloy airfoil.

The prongs can be formed as part of the wax mold, those prongs extending toward and/or to the core, so that after wax injection there remains a hole in the pattern that is filled with shell material, and upon hardening of the molten alloy and removal of the core, cooling holes remain in the alloy airfoil.

The prongs can be formed as part of the shell, those prongs extending toward and/or to the core, so that after hardening of the molten alloy and removal of the shell (including its prongs), holes remain in the alloy airfoil.

A set of prongs can extend from the core, and a corresponding set can extend from the wax mold and/or from the shell, such that the two sets meet to define the desired holes through the airfoil.

Instead of, and/or in addition to prongs, holes can be provided in the wax pattern, potentially via prongs in the wax mold, those holes adapted to be filed with ceramic during the dipping process.

It is possible, using the TLM process, to directly mold a shell rather than creating it via repeatedly dipping the wax pattern in a liquid ceramic. This "direct shell" approach can eliminate the need to create the wax mold and the wax pattern, and instead allow the core to be placed where desired within the shell, followed by injection of the molten metal.

Thus, any prong and/or set of prongs can help align the core within the wax mold, to align the wax pattern within the shell, and/or to align the core within the shell, such as when it has been produced using the "direct shell" approach.

A hole need not extend entirely through the airfoil. That is, rather than defining a "through hole", a prong and/or wax pattern hole can define a "blind hole" that does not extend all the way through. Such a blind hole can be extended into a through hole using any of various traditional machining techniques, such as drilling, reaming, cutting, milling, grinding, water jet cutting, laser cutting, electron beam machining, photo-chemical machining, electro-chemical machining, electrical discharge machining ("EDM"), and/or ultrasonic machining, etc.

Whether provided as a through hole or a blind hole, a hole can be designed and/or produced to be compatible with a traditional machining technique that can be used to "finish" that hole. The traditional machining technique can be used to convert a blind hole to a through hole, and/or to provide a desired parameter, such as a desired dimension, cross-sectional shape, surface finish, and/or coating, etc., to any desired depth of the hole.

Extending this concept, a prong can extend from the core toward and/or to a target (e.g., a groove, channel, trough and/or oversized blind hole, etc.) in the wax pattern and/or shell, the target somewhat wider than the cross-sectional shape of the prong at its end, thereby somewhat simplifying alignment of the prong and/or its resulting hole. Likewise, a prong can extend from the shell toward and/or to an oversized target in the wax pattern and/or core. Similarly, a hole formed in the wax pattern can extend toward and/or to an oversized target in the core and/or the shell.

Because a prong can extend substantially perpendicularly to, and/or can substantially oppose, the flow of the wax and/or molten alloy, and because the aspect ratio of a prong can make it susceptible to breakage, steps can be taken to preserve the integrity of one or more prongs, particularly prior to formation of the airfoil. For example, multiple prongs can be formed as an array joined by a base, such that the array resembles a ladder with one rail removed, each of the prongs corresponding to a rung of the ladder, the prongs joined by a base that resembles the remaining rail of the ladder. By forming such a "ladder array" of prongs separately from, for example, the core (or shell), de-molding the core can be easier than if the prongs were initially part of the core, since the core's de-molding direction or "pull plane" otherwise might be in opposition to the orientation of the prongs. By forming the ladder array separately from, e.g., the core, the ladder array can be formed from a different, perhaps stronger, material (e.g., alumina) than the core. The prongs can be coated with a consumable material, such as a wax, that can protect the prongs during assembly and/or during injection of the molten wax and/or alloy. The prongs and/or ladder array can be re-enforced, such as by molding ceramic around a re-enforcing foil. Both the ceramic and the foil can be consumable once the holes have been formed in the airfoil and/or as the molten alloy cools to form the airfoil and define its holes.

The wax mold can have prongs or protrusions that define the desired holes. For examples, the wax mold can define prongs that can extend inward toward and/or to the core to define holes in the wax pattern.

After filling the wax mold with molten wax, that wax can sometimes shrink (or "cavitate") while cooling such that the resulting wax pattern does not retain the desired dimensions for the airfoil. To prevent such shrinkage and/or dimensional instability, unmolten blocks of wax (sometimes called "chills") can be pre-positioned in the wax mold, particularly in areas susceptible to such shrinkage. When the molten wax encounters these unmolten blocks, it typically simply flows around them, bolding at the exposed surfaces of the blocks and, upon cooling of the molten wax, forming a continuous wax pattern around the (often ceramic) core.

Chills also can be positioned upstream of prongs and/or a ladder array, to shield and/or protect against breakage of the prongs and/or ladder arrays caused by the onrush and/or pressure of the flowing molten wax. Likewise, chills can be designed, shaped, and/or positioned to improve wax flow during injection. Similarly, features in the core, wax pattern, and/or shell can be designed, shaped, and/or positioned to improve wax flow during injection, improve the flow of ceramic during the shell dipping process, provide a designed surface finish, provide a desired surface geometry, etc.

In some embodiments, chills can be designed and/or produced (potentially via the TLM process) that have one or more desired holes. Those holes can be shielded to prevent clogging by the molten wax, yet can be cleared after the wax pattern has been formed so that they can be filled by the liquid ceramic during the dipping process.

Note that rather than using wax to fill the wax mold, and/or wax to form the chills, a foam material can be utilized, that foam having some properties in common with wax, such as being injectable, thermoformable, etc.

Ceramic shells can be designed and/or produced that have prongs that form desired holes. Utilizing the TLM process, the prongs can be formed integral to the shell, and/or can be formed separately and attached to the shell prior to filling the shell with molten metal. The prongs can be coated with a consumable material, such as wax, that protects the prongs from breakage caused by the pressure and/or flow of the molten metal.

Whether formed via a prong that extends from a core, wax mold, and/or shell, any hole in the airfoil can be designed and/or produced with nearly any desired parameter, such as any dimension, cross-sectional shape, surface finish, coating, and/or fiducial, etc., at any desired depth of the hole. For example, a prong and/or wax pattern hole can define an airfoil hole that has:

- an entry and/or exit that is radiused, filleted, and/or curved, thereby allowing for more laminar airflow through the hole;
- a reduction in cross-section at a desired depth to control air velocity and/or pressure drop;
- a dimpled inner surface over some portion of the hole to create a desired level of turbulence in the airflow and/or to influence a level of noise generated due to the airflow through the hole and/or gas circulation around the airfoil;
- an angled and/or curved longitudinal axis with respect to the longitudinal axis of the airfoil, which can serve to aim the airflow in a desired direction;
- a counter-sunk "moat-like" region near its entrance and/or exit to absorb, store, and/or contain any "back strike", "re-cast", or other potentially problematic material that is generated by a traditional machining technique that finishes the hole;
- a fiducial (e.g., a tactile and/or visual marking and/or reference point) on a sidewall of the hole and/or a "bottom" of a blind hole, the fiducial adapted to locate a given hole and/or align a traditional machining technique with the hole;
- a channel connecting it to another hole, that channel potentially extending between the holes at any position along the longitudinal axis of each hole, such as midway along the length of each hole;
- a cross-section that, at any given location along the length of the hole, is other than round (e.g., elliptical, lumpy, dimpled, polygonal, etc.); and/or
- a stress, fatigue, and/or crack reduction feature, such as:
- expanded radii or fillets at an entrance or exit of the hole;
- surface features such as dimples or depressions located between holes to arrest cracks;
- a groove having a predetermined depth, the groove oriented perpendicular to an expected crack propagation direction; and/or
- a standing material, similar to a speed bump, having a predetermined height, the bump oriented perpendicular to an expected crack propagation direction;
- etc.

In certain embodiments, the wax mold can be formed using metal bases over which a rubber insert and/or liner can be attached, the rubber insert and/or liner formed via the TOMO process, and adapted to define the shape of the wax pattern. Variations in the rubber insert/liner (e.g., durometer, thickness in region of prong, etc.) can encourage the survival of prongs during wax injection into the wax mold.

In certain embodiments, airfoils can be created that have multiple cavities separated by corresponding inner walls. Because some of these inner walls can be located relatively closely to the outer walls of the airfoils, the likelihood of striking an inner wall ("strike-through") when machining the outer wall can be considerable. Thus, certain embodiments can provide blind holes from an inner cavity to the outer wall, those blind holes shaped to avoid strike-through when machining through the outer wall from the outside toward the inner cavity. For example, such blind holes can be cast having a curved longitudinal axis.

In certain embodiments, an inner cavity can be connected to an adjacent inner cavity by a hole having any of the characteristics described herein.

Holes can have any desired "width" or "cross-sectional dimension" (i.e., the hole's dimension substantially perpendicular to the longitudinal axis of the hole). For example, a hole can have a width of approximately 0.001" to approximately 0.1". Relatively small holes (e.g., those have a width of approximately 0.001" to approximately 0.020") sometimes can easily plug from debris in air or other fluid passing therethrough. To address this challenge, certain embodiments can provide one or more features adapted to collect, divert, and/or filter the debris, such as:

- a surface feature at the entry surface of a hole that is adapted to act as "moat", "trough", or "parking lot" for debris;
- a surface geometry at the entry to the hole or along the walls that define the hole that have undercuts, irregularities, or a sufficient roughness;
- filtering projections (e.g., whiskers or bristles) extending from the sidewalls of the hole;
- a surface feature adapted to slow the speed of the air sufficiently to cause debris to drop out of the air stream; and/or
- blind pockets extending away from the sidewalls of the hole to provide reservoirs for accumulating debris;
- etc.

Note that certain embodiments of such features can vary depending on the location air is applied. For example, certain locations within a turbine might encounter air having a higher debris concentration, or debris having larger and/or smaller average cross-sectional dimensions, or simply be more vulnerable to failure due to debris-caused plugging.

Certain embodiments can implement a multi-pull-plane approach, such as via pulling a liner in one direction off of a given mold, and pulling a insert off of the same mold in a different direction; or by pulling one part from a given mold in one direction, and another part from the same mold in a different direction.

To de-mold certain prongs, the mold can be split around its holes to allow for easy removal of prong from mold (e.g., makes easier to de-mold zig-zag prongs).

Figure 1:
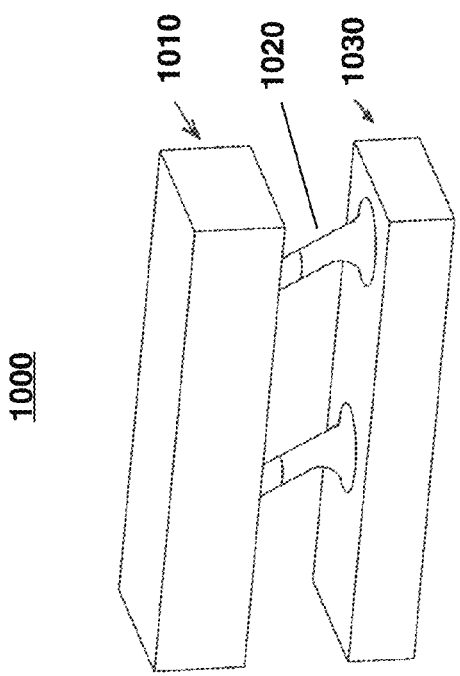
FIG. 1 presents an isometric view of an exemplary structure 1000.

FIG. 1 presents an isometric view of an exemplary structure 1000 that can be manufactured via TLM and the investment casting process. Connecting portion 1010 and portion 1030 can be a first connector and/or prong 1020, that can be formed from a first partial prong 1022 and a second partial prong 1024 that meet to define prong 1020, which can be characterized by a longitudinal axis 1100 and/or a primary longitudinal cross-sectional width 1200. A ceramic version of structure 1000 can serve as an investment casting mold via which molten metal flows around some portion of structure 1000 and solidifies. After sufficiently cooling of the metal, structure 1000 can be removed, such as via mechanical stress-induced shattering, thermal stress-induced fracturing, shaking, blowing, washing, chemical leaching, etc.

Portion 1010 and/or portion 1030 can represent, respectively:

- a ceramic core and a wax pattern mold;
- a ceramic core and a ceramic shell; or
- a wax pattern mold and a ceramic shell.

FIG. 2 presents a front view of exemplary structure 1000.

FIG. 3 presents a top view of metallic structure 3000 produced using structure 1000 of FIG. 1 as an investment casting mold.

FIG. 4 presents a cross-sectional view, taken at section 3-3 of FIG. 3. Metallic structure 3000 can comprise and/or be comprised by an airfoil 4100 that defines a plurality of cooling holes 4200, each hole characterized by a longitudinal axis and/or a longitudinal cross-sectional width.

FIG. 5 presents an isometric view of an exemplary structure 5000 that can be manufactured via TLM and the investment casting process.

FIG. 6 presents a top view of structure 5000, and FIG. 7 presents a cross-sectional view, taken at section 6-6 of FIG. 6.

Note that the prongs defined by structure 5000 are not complete, but instead are partial prongs 5022 and 5024, and thus any holes formed via molding around structure 5000 will be "blind" and/or not be complete through-holes without further machining.

FIG. 8 presents a top view of metallic structure 8000 produced, for example, using structure 1000 of FIG. 1 or structure 5000 of FIG. 5 as an investment casting mold. FIG. 9 presents a cross-sectional view, taken at section 8-8 of FIG. 8. Note that the holes 8022, 8024 in FIG. 9 are blind and/or incomplete without further machining.

Figure 10:
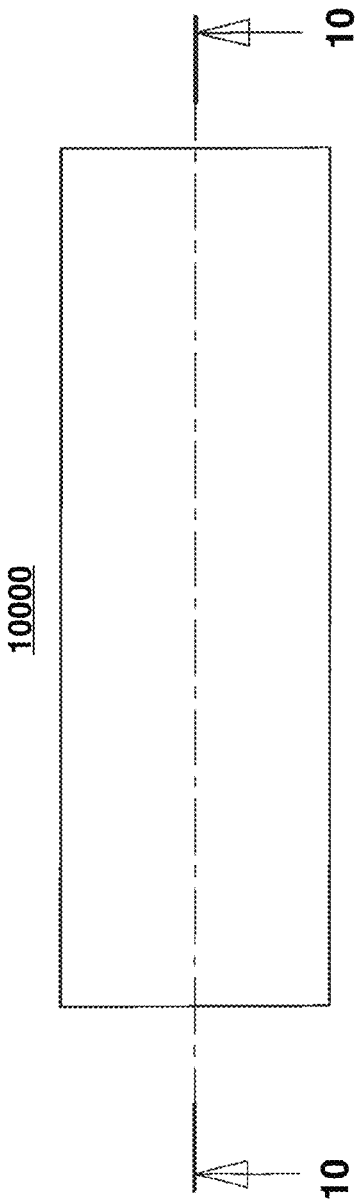
FIG. 10 presents a top view of an exemplary structure 10000.

FIG. 10 presents a top view of an exemplary structure 10000 that can be manufactured via TLM and the investment casting process.

Figure 11:
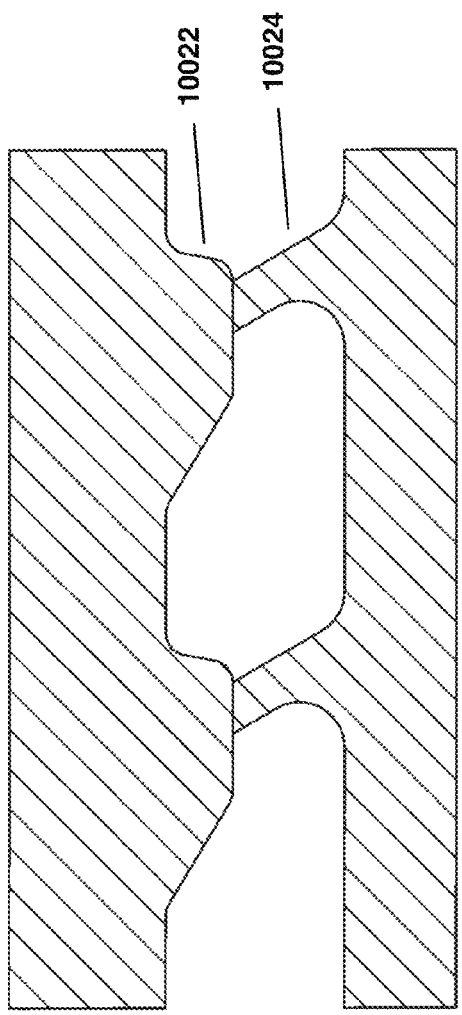
FIG. 11 presents a cross-sectional view, taken at section 10-10 of FIG. 10.

FIG. 11 presents a cross-sectional view, taken at section 10-10 of FIG. 10. Note the moat-like entrance region 10022 and the partial prong 10024.

FIG. 12 presents a top view of metallic structure 12000 produced, for example, using structure 10000 of FIG. 10 as an investment casting mold. FIG. 13 presents a cross-sectional view, taken at section 12-12 of FIG. 12. Note the moat-like entrance region 12022 to hole 12024.

FIG. 14 presents an isometric view of an exemplary structure 14000 that can be manufactured via TLM and the investment casting process.

FIG. 15 presents a front view of exemplary structure 14000, FIG. 16 presents a top view of exemplary structure 14000, and FIG. 17 presents a cross-sectional view, taken at section 16-16 of FIG. 16. Note connector 14300 connecting prongs 14100 and 14200.

FIG. 18 presents a top view of metallic structure 18000 produced, for example, using structure 14000 of FIG. 14 as an investment casting mold. FIG. 19 presents a cross-sectional view, taken at section 18-18 of FIG. 18. Note passage 18300 connecting holes 18100 and 18200.

Figure 21:
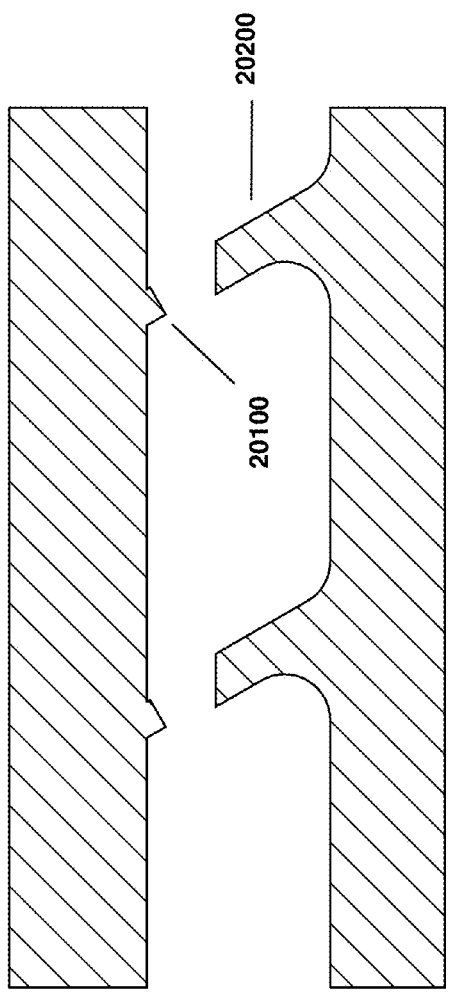
FIG. 21 presents a cross-sectional view, taken at section 20-20 of FIG. 20.
Figure 20:
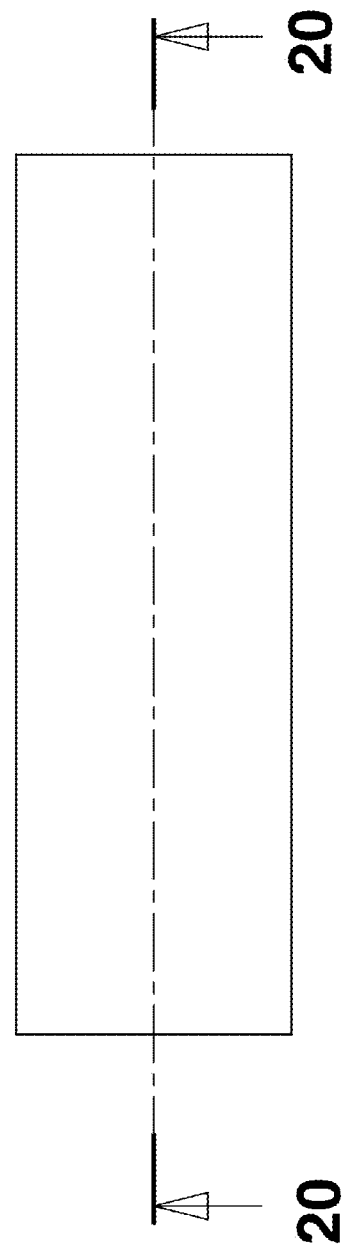
FIG. 20 presents a top view of exemplary structure 20000.

FIG. 20 presents a top view of exemplary structure 20000, and FIG. 21 presents a cross-sectional view, taken at section 20-20 of FIG. 20. Note fiducial prong 20100 and partial prong 20200.

Figure 23:
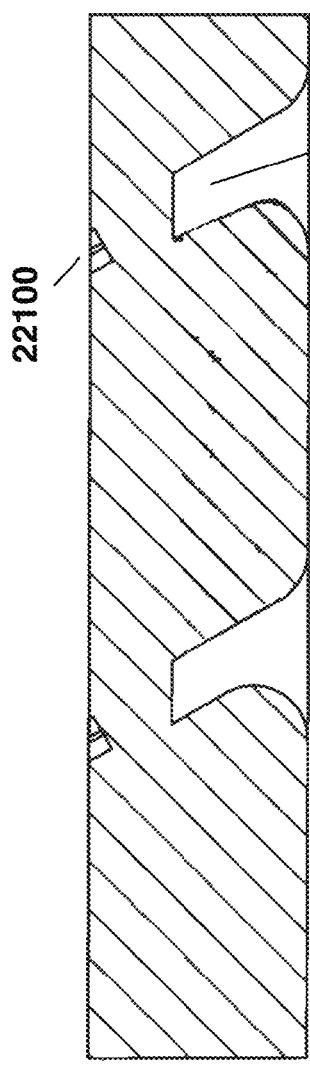
FIG. 23 presents a cross-sectional view, taken at section 22-22 of FIG. 22.
Figure 22:
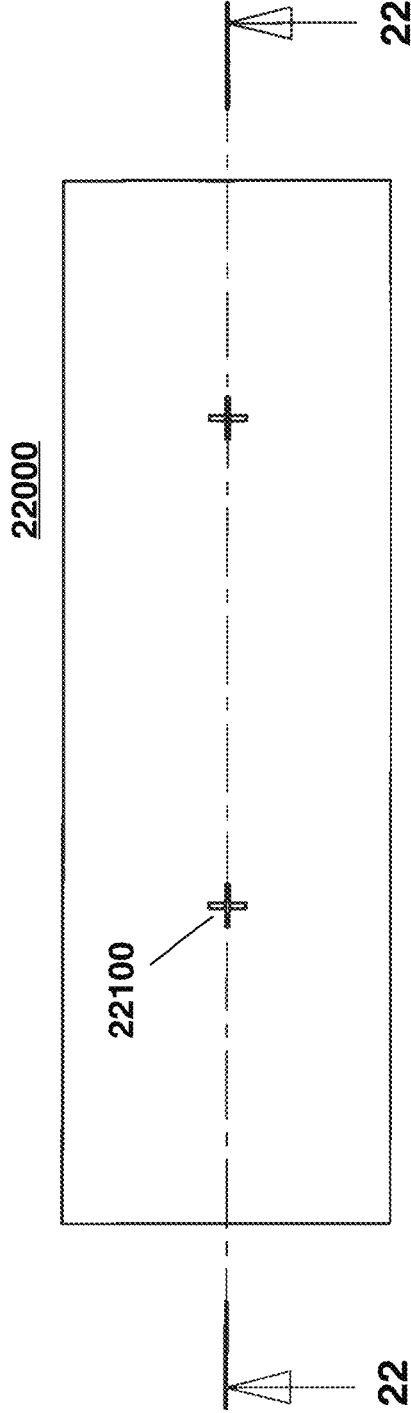
FIG. 22 presents a top view of metallic structure 22000.

FIG. 22 presents a top view of metallic structure 22000 produced, for example, using structure 20000 of FIG. 20 as an investment casting mold. FIG. 23 presents a cross-sectional view, taken at section 22-22 of FIG. 22. Note blind hole 22200 and locating feature or fiducial 22100 that indicates where to machine from the top surface to finish the hole.

FIGS. 24-29 present exemplary cross-sectional views of a plurality of exemplary holes in an exemplary metal casting (taken, e.g., at section 3-3 of FIG. 3) that can be produced using the TLM process to create, e.g., a ceramic casting vessel. Note the complex hole geometries that can be possible using the TLM process and that can not be traditionally machined. Note also the variety of fillets accompanying those holes.

Figure 31:
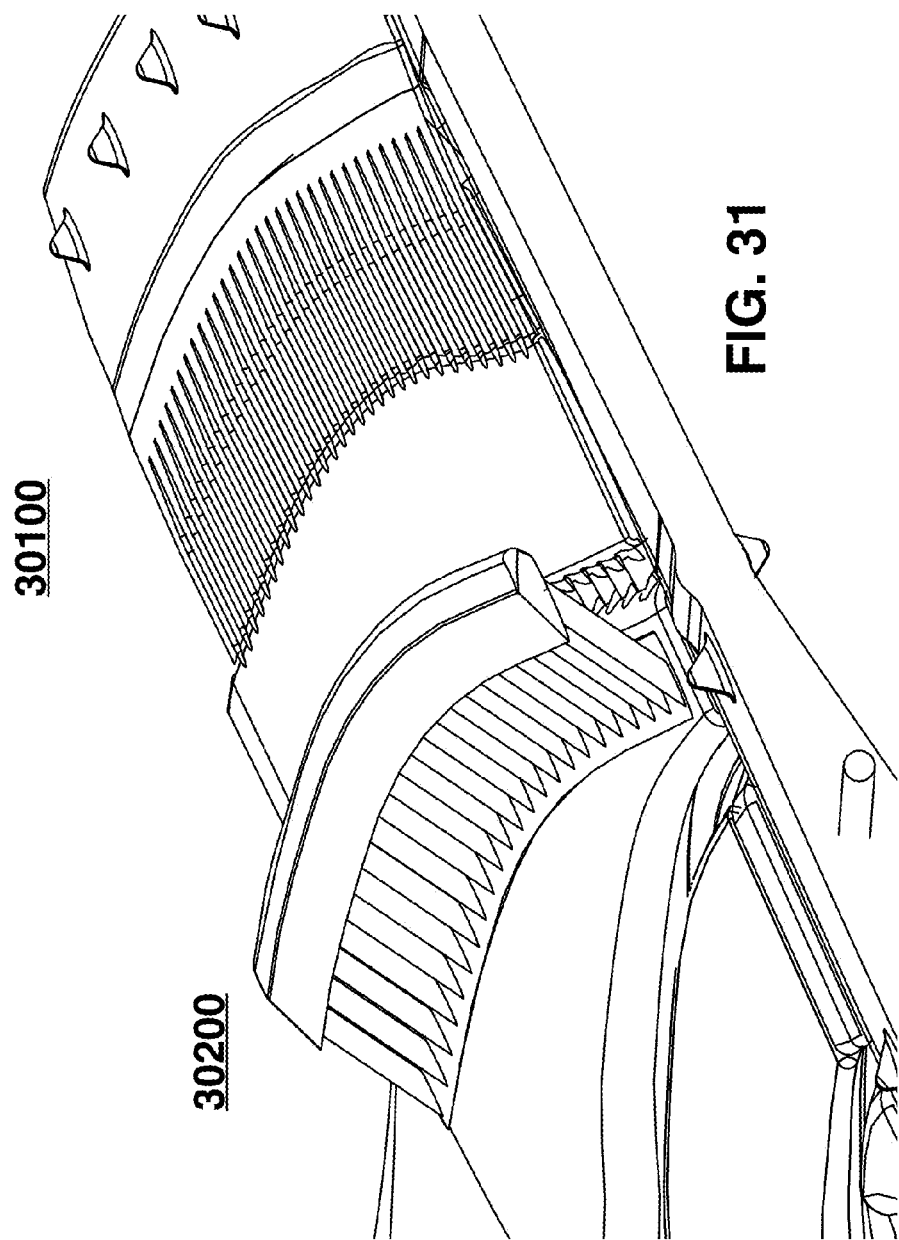

FIG. 30 and FIG. 31 present isometric views of an exemplary base structure 30100 and an exemplary ladder array 30200 of prongs that can be inserted into and/or joined with base structure 30100. The assembly then can be used in the investment casting process to create holes in a metal casting.

Figure 32:
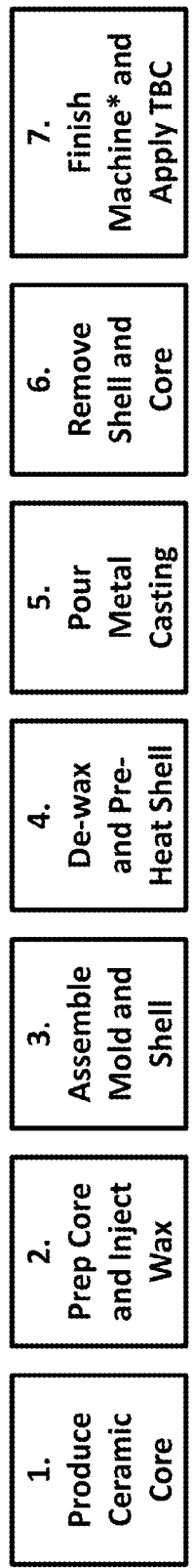
FIG. 32 presents a flowchart of an exemplary embodiment.

FIG. 32 presents a flowchart of an exemplary embodiment of an investment casting process that can utilize TLM.

Figure 33:
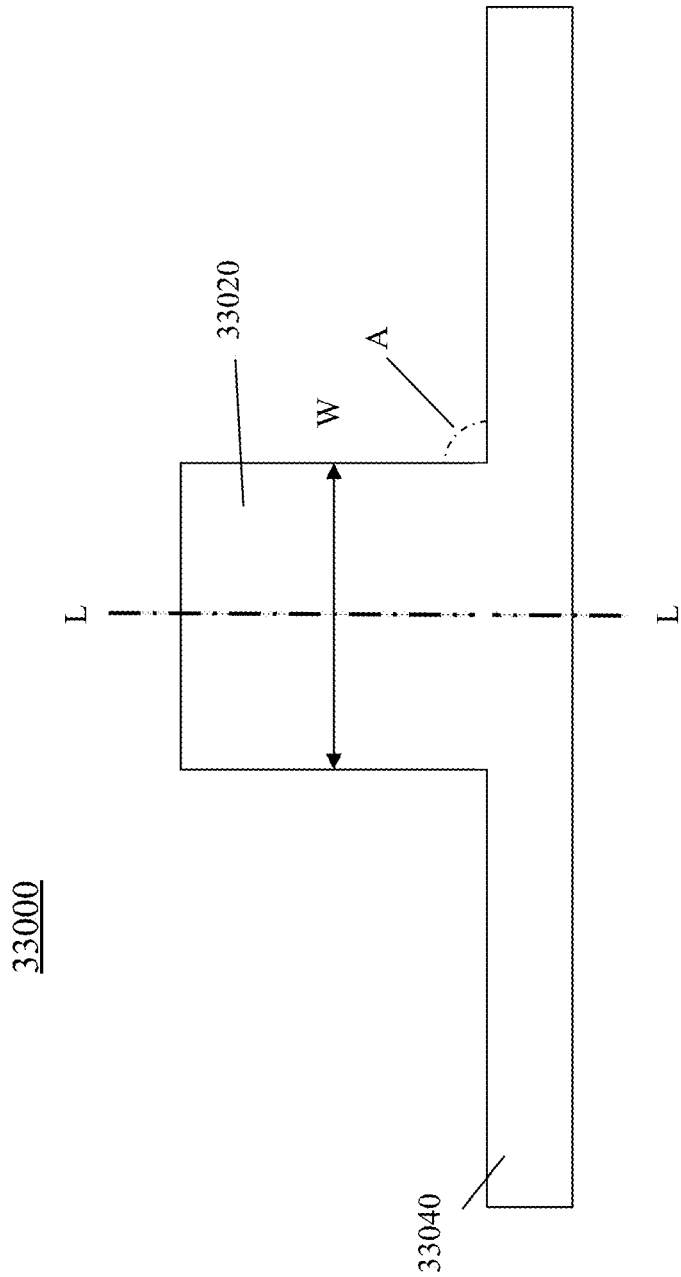
FIG. 33 presents a front view of an exemplary embodiment of a portion of a generalized form 33000.

FIG. 33 presents a front view of an exemplary embodiment of a portion of a generalized form 33000 comprising a prong 33020 that can protrude from a base 33040. Prong 33020 can be characterized by a longitudinal axis L, a width W, and/or an angle A that can be formed at an intersection of prong 33020 and base 33040.

Figure 34:
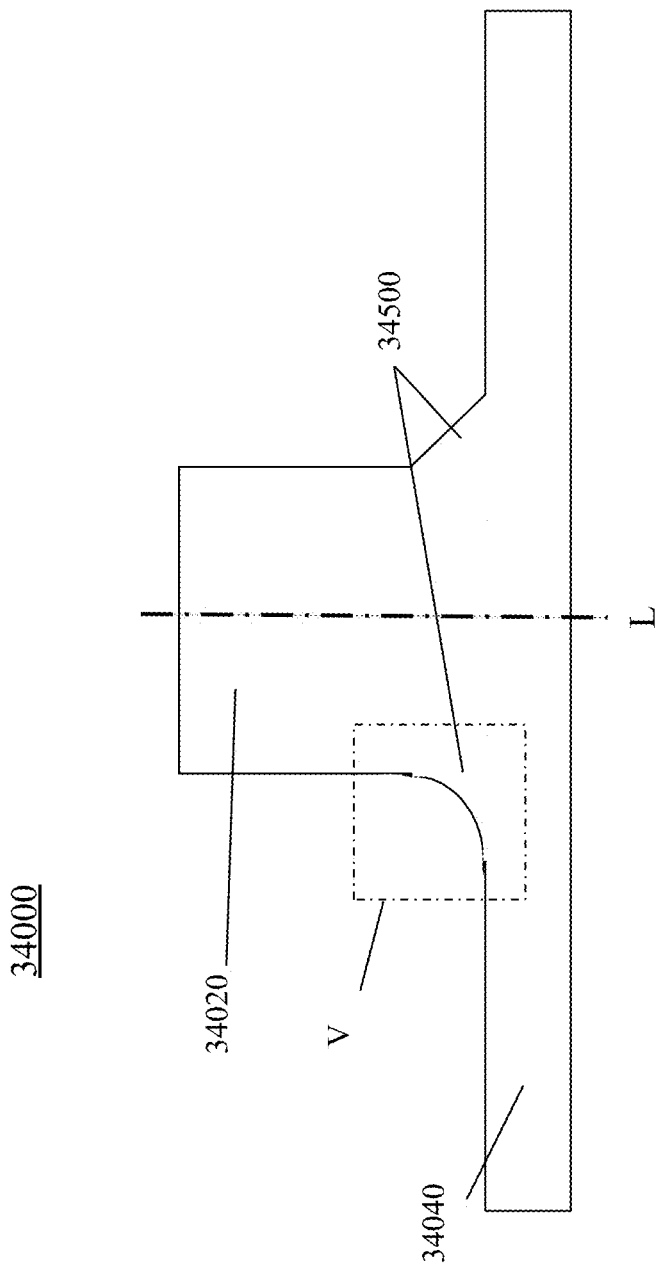
FIG. 34 presents a front view of an exemplary embodiment of a portion of a generalized form 34000.

FIG. 34 presents a front view of an exemplary embodiment of a portion of a generalized form 34000 comprising a prong 34020 that can protrude from a base 34040. An intersection of prong 34020 and base 34040 can define a fillet 34500. Fillet 34500 can be defined by one or more radii and/or segments, any of which can change in dimensions, emerge, and/or disappear as fillet 34500 extends around longitudinal axis L of prong 34020.

Figure 35:
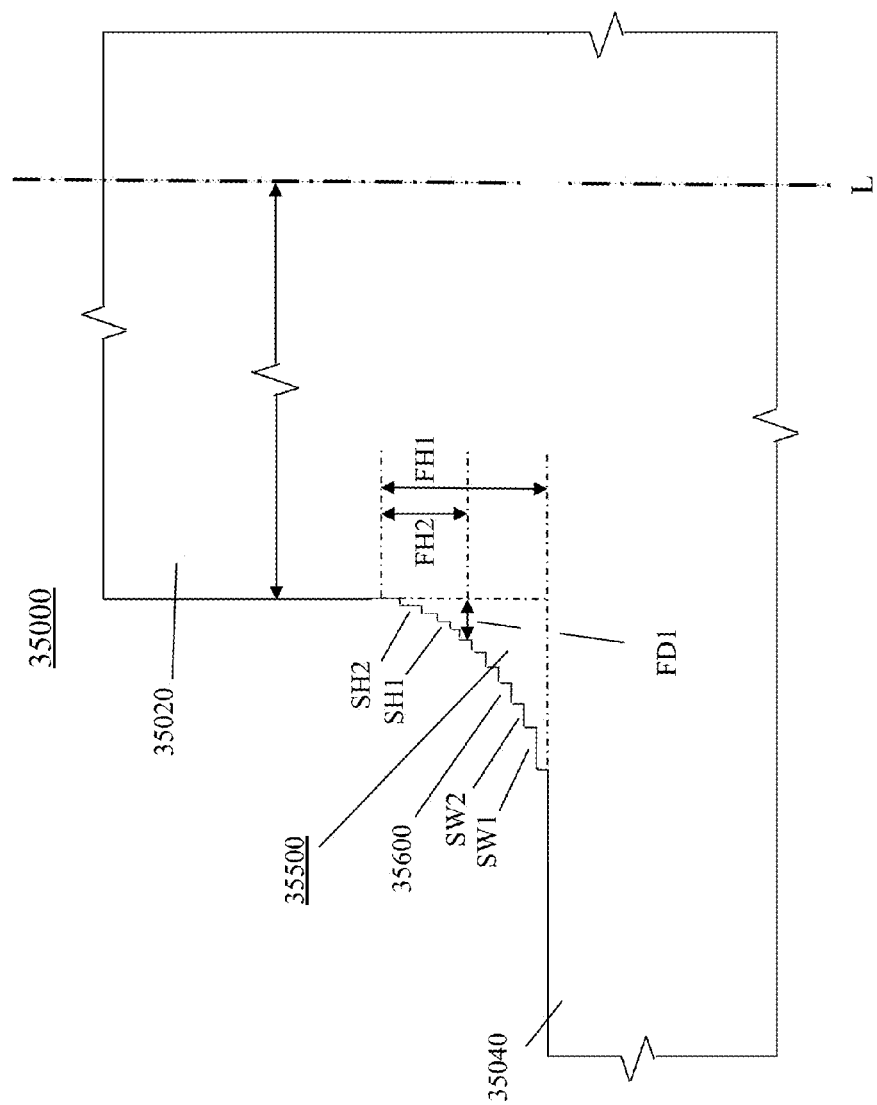
FIG. 35 presents a close-up view of box V of FIG. 34.

FIG. 35 presents a close-up view of box V of FIG. 34 and showing a portion of a generalized form 35000 comprising a prong 35020 that can protrude from a base 35040. An intersection of prong 35020 and base 35040 can define a fillet 35500. As shown, rather than being perfectly smooth and/or rounded, fillet 35500 can, viewed at very high magnification, resemble a series of stairs 35600 and/or staircase, potentially having some stairs of unequal tread width and/or riser height, such that a stair width SW1 can be greater than a stair width SW2, and/or a stair height SH1 can be less than a stair height SH2. The widths and/or heights of steps 35600 can geometrically replicate a thickness of a foil and/or layer from a multi-layer metallic foil stacked lamination mold from which stairs 35600 descended.

Fillet 35500 can be defined by a fillet height FH1 that, for and within a predetermined plane that contains longitudinal axis L, can be measured from a form plane that is tangent to an exterior surface of base 35040 and is intersected by prong 35020 (that is, from a base transition that is located where fillet 35500 substantially blends into base 35040), and measured to a plane that is parallel to the form plane and intersects a location where fillet 35500 substantially blends into prong 35020. Fillet 35500 can define a midpoint height FH2 that is half the length of fillet height FH1. Fillet 35500 can define a fillet midpoint depth FD1 that can be measured at and perpendicular to midpoint height FH2.

Figure 36:
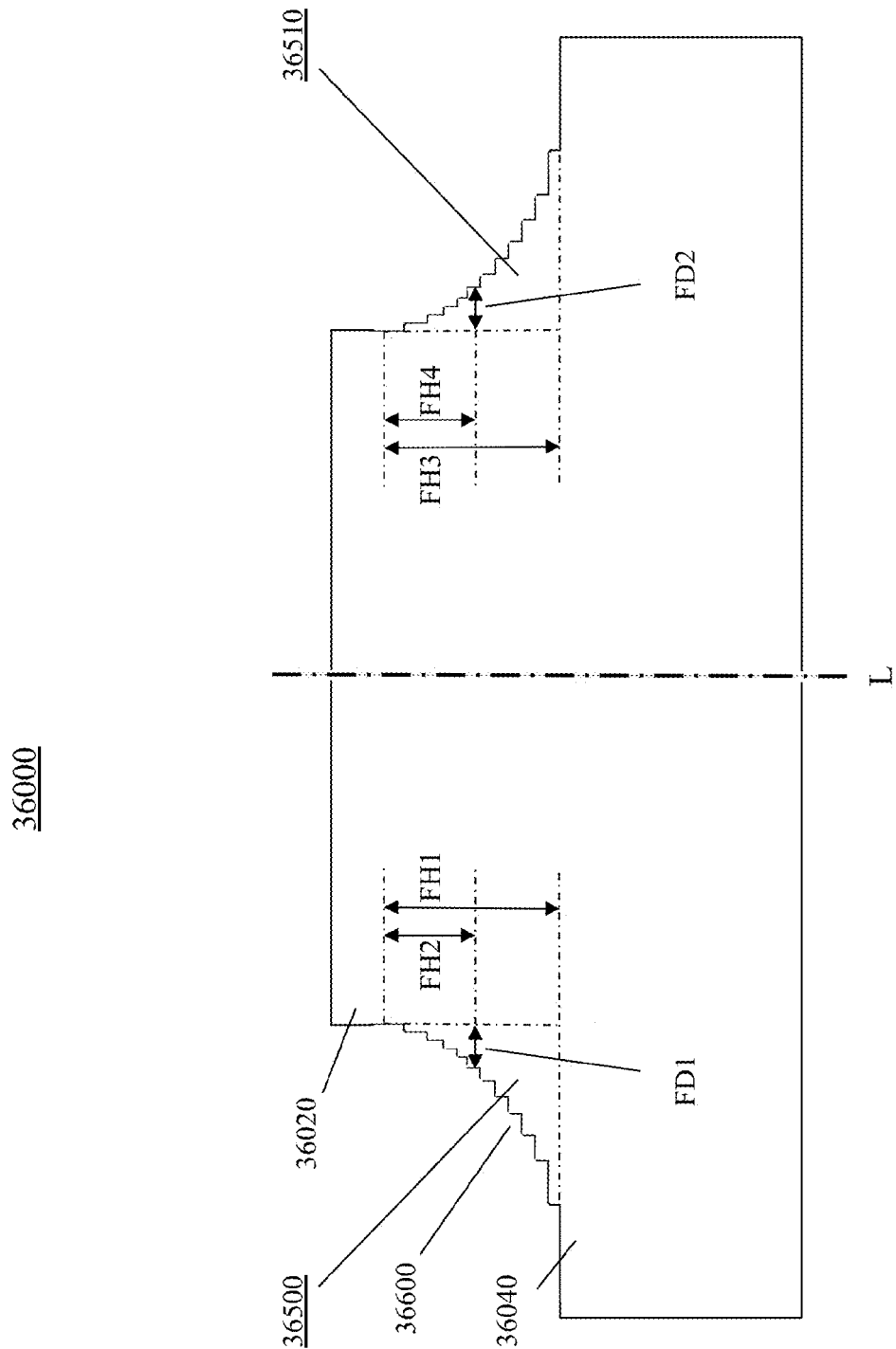
FIG. 36 presents a front view of an exemplary embodiment of a portion of a generalized form 36000.

FIG. 36 presents a front view of an exemplary embodiment of a portion of a generalized form 36000 comprising a prong 36020 that can protrude from a base 36040. An intersection of prong 36020 and base 36040 can define a first fillet 36500 and an opposing second fillet 36510. In certain exemplary embodiments, second fillet 36510 can have an equal or different fillet height FH3 than the fillet height FH1 of first fillet 36500. Likewise, second fillet 36510 can have an equal or different fillet midpoint height FH4 than the fillet midpoint height FH2 of first fillet 36500. Similarly, second fillet 36510 can have an equal or different fillet midpoint depth FD2 than the fillet midpoint depth FD1 of first fillet 36500.

Figure 37:
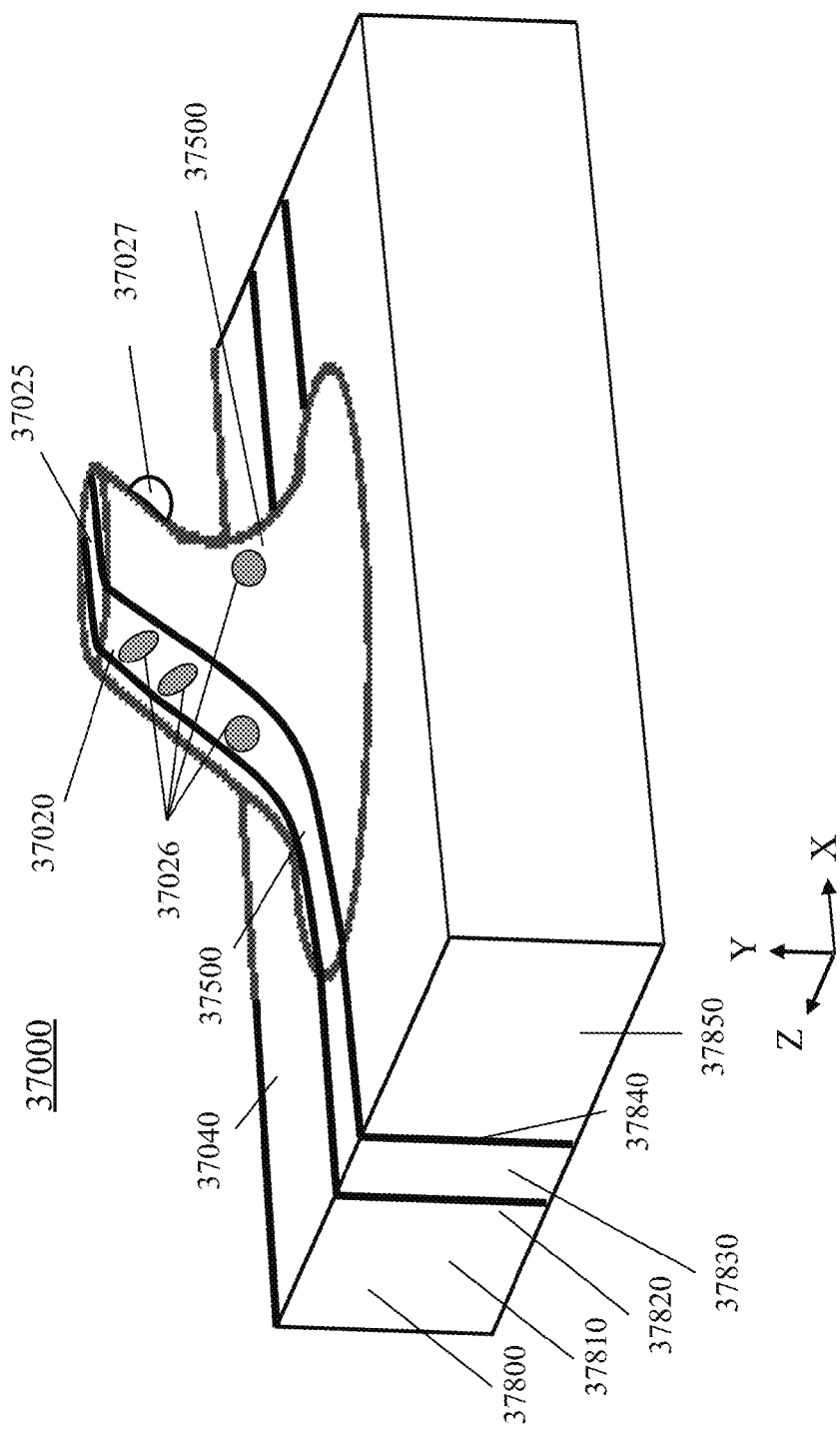
FIG. 37 presents a perspective view of an exemplary embodiment of a portion of a generalized form 37000.

FIG. 37 presents a perspective view of an exemplary embodiment of a portion of a generalized form 37000 comprising a prong 37020 protruding from a base 37040 and terminating at a prong terminus 37025. Penetrating, perforating, and/or extending inwardly into prong 37020 can be one or more dimples 37026. Bulging, jutting, and/or extending outwardly from prong 37020 can be one or more protrusions 37027. At the intersection of prong 37020 and base 37040 can be a fillet 37500, which can change in shape, dimensions, and/or radius as it extends around a periphery of prong 37020. For convenience, any portion of form 37000 can be referred to with respect to a 3-dimensional Cartesian coordinate system having orthogonal X, Y, and Z axes as shown.

Figure 41:
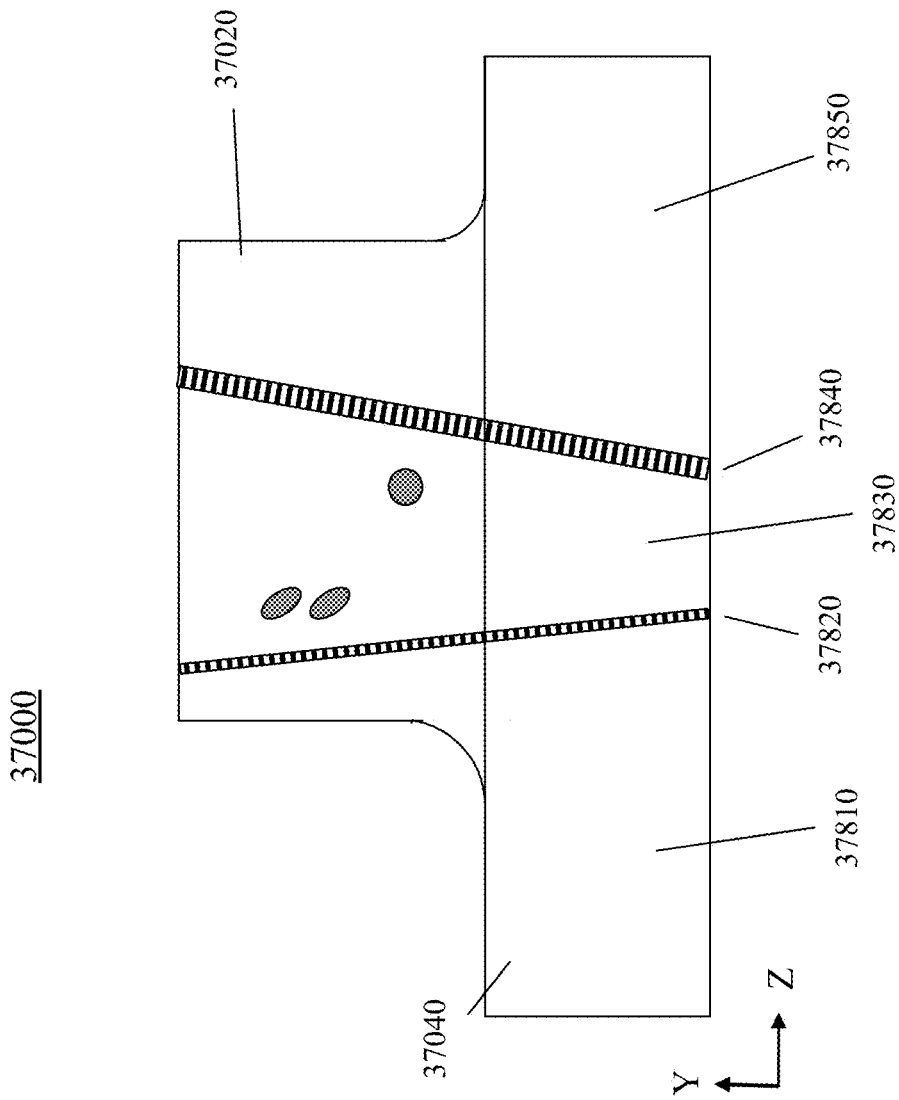
FIG. 41 presents a side view of an exemplary embodiment of a portion of generalized form 37000.

Form 37000 can be molded, directly or indirectly (i.e., multi-generationally), from an ancestor mold, such as a multi-layered metallic foil stacked lamination mold. Due to slight gaps and/or misalignments between layers of that ancestor mold, artifacts can be imparted on one or more surfaces 37800 of form 37000. Thus, form 37000 can evidence surface artifacts 37820, 37840, which can extend across a top surface of base 37040 and prong 37020, as well as across one or more end surfaces of base 37040. Artifacts 37820, 37840 can give the impression of being seams, yet they need not extend substantially below the surface 37800 of form 37000. Nevertheless, artifacts 37820, 37840 can divide surface 37800 into zones 37810, 37830, and 37850, which can extend across base 37040 and/or prong 37020. As measured in the Z direction, and as shown in FIG. 41, each of zones 37810, 37830, 37850 can, but need not, be defined by a substantially uniform width throughout that zone and/or compared to its adjacent zone. Similarly, artifacts 37820, 37840 can, but need not, be substantially parallel.

Figure 38:
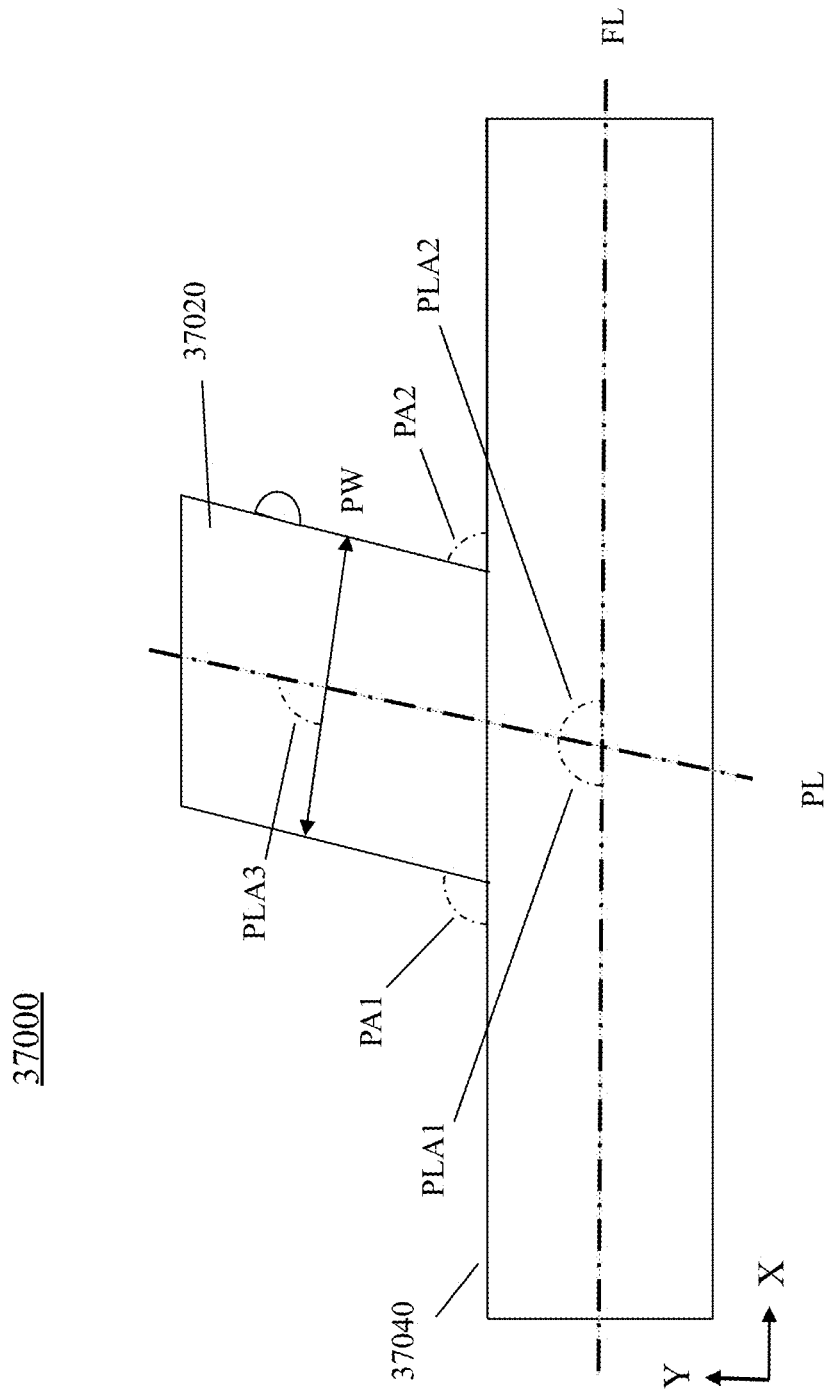
FIG. 38 presents a front view of an exemplary embodiment of a portion of generalized form 37000.

FIG. 38 presents a front view (i.e., looking down the Z axis) of an exemplary embodiment of a portion of generalized form 37000 comprising prong 37020 protruding from base 37040. To avoid confusion, note that in this view, fillet 37500 is not shown at the intersection of prong 37020 and base 37040, yet that intersection can define complementary angles PA1 and PA2. Also shown is base longitudinal axis FL, which can be intersected by prong longitudinal axis PL, thereby defining two complementary angles PLA1 and PLA2, each of which can be other than 90 degrees. Prong cross-sectional width PW can be measured perpendicularly to prong axis PL, such that their intersection defines angle PLA3 which can be 90 degrees.

Figure 39:
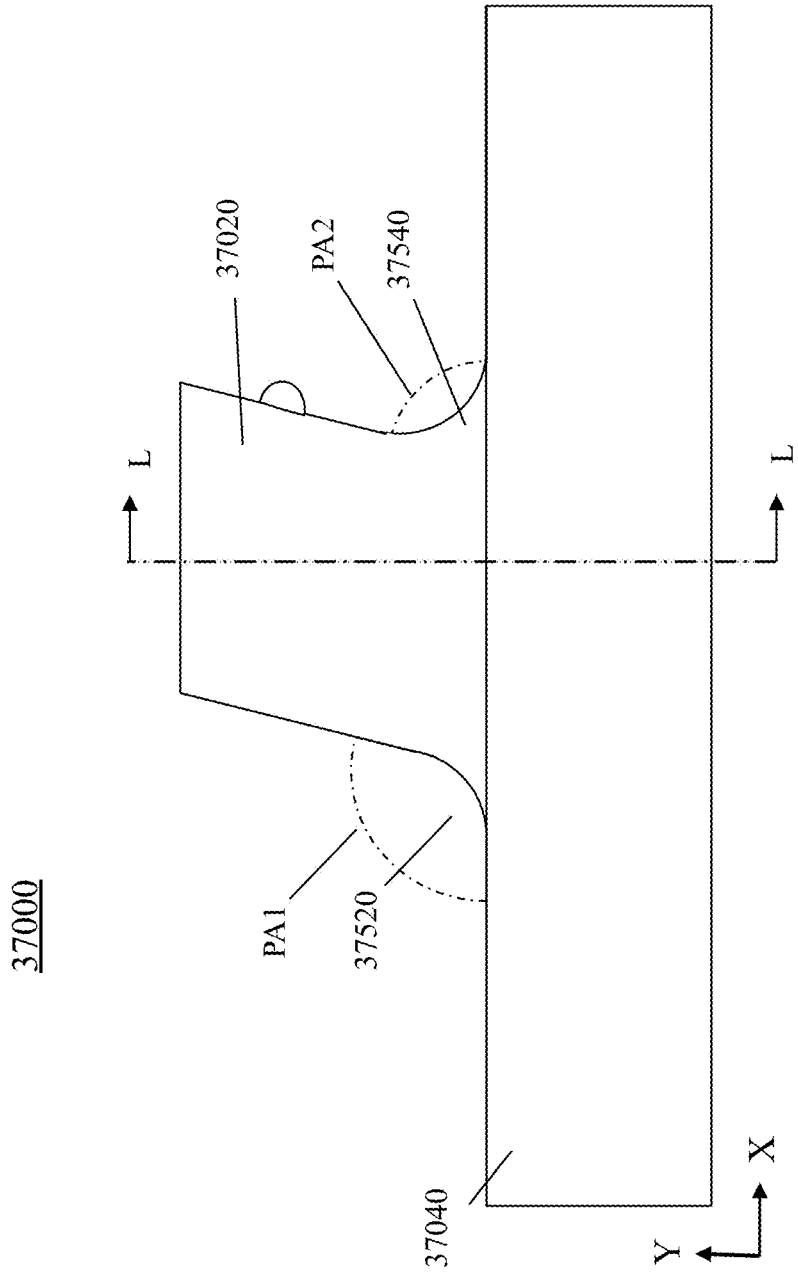
FIG. 39 presents a front view of an exemplary embodiment of a portion of generalized form 37000.

FIG. 39 presents a front view (i.e., looking down the Z axis) of an exemplary embodiment of a portion of generalized form 37000 comprising prong 37020 protruding from base 37040. In this view, fillet portions 37520 and 37540 of fillet 37500 are shown at the intersection of prong 37020 and base 37040, that intersection defining complementary angles PA1 and PA2 that need not be 90 degrees. Note that fillet portion 37520 need not have the same shape, dimensions, and/or radius as fillet portion 37540.

Figure 40:
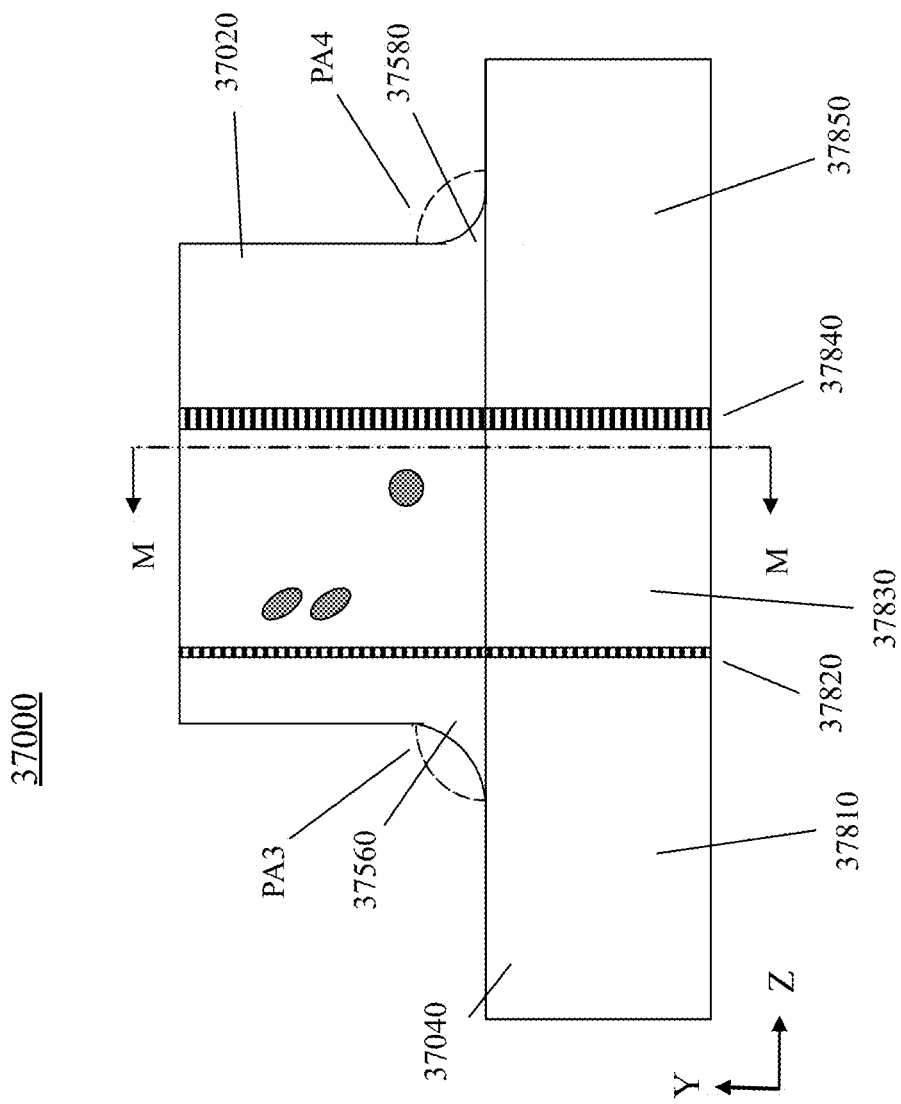
FIG. 40 presents a side view of an exemplary embodiment of a portion of generalized form 37000.

FIG. 40 presents a side view (i.e., looking down the X axis) of an exemplary embodiment of a portion of generalized form 37000 comprising prong 37020 protruding from base 37040. In this view, fillets 37560 and 37580 are shown at the intersection of prong 37020 and base 37040, that intersection defining complementary angles PA3 and PA4 that can, but need not, be 90 degrees. Note that fillet portion 37560 need not have the same shape, dimensions, and/or radius as fillet portion 37580, nor the same shape, dimensions, and/or radius as fillet portion 37520 and/or 37540 from FIG. 39.

FIG. 41 presents a side view (i.e., looking down the X axis) of another exemplary embodiment of a portion of generalized form 37000 comprising prong 37020 protruding from base 37040. In this view, artifacts 37820, 37840 are not parallel.

Figure 42:
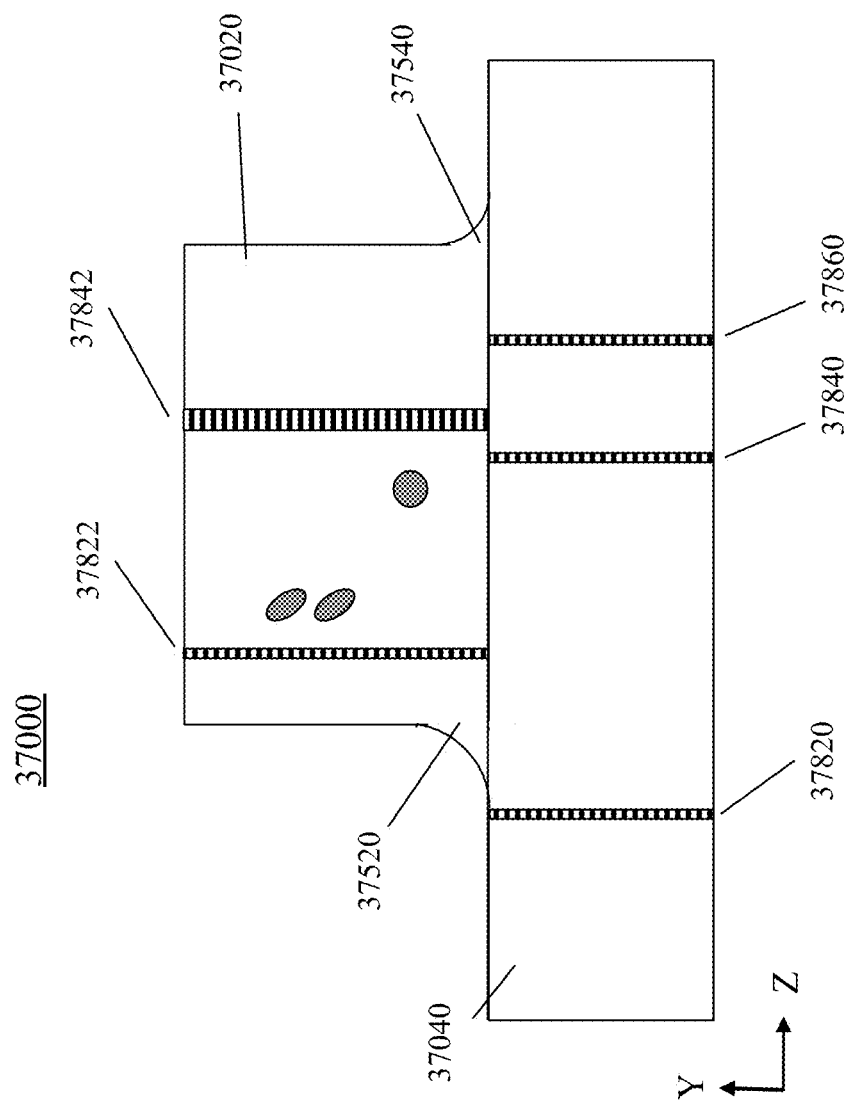
FIG. 42 presents a side view of an exemplary embodiment of a portion of generalized form 37000.

FIG. 42 presents a side view (i.e., looking down the X axis) of still another exemplary embodiment of a portion of generalized form 37000 comprising prong 37020 protruding from base 37040. In this view, artifacts 37820, 37840, 37860 are not aligned with artifacts 37822, 37842, since the ancestor form for base 37040 need not be the same as the ancestor form for prong 37020, although the immediate parent mold for base 37040 can be the same as the parent mold for prong 37020. Also, fillet portion 37520 is shown considerably larger than fillet portion 37540. Note that any of artifacts 37820, 37840, 37860 and/or any corresponding planes containing artifacts 37820, 37840, 37860 can be co-planar, parallel to, and/or perpendicular to artifacts 37822 and/or 37842 and/or any corresponding planes containing artifacts 37822 and/or 37842. Note also that any of artifacts 37820, 37840, 37860, 37822, and/or 37842 can be segmented, angled, curved, and/or non-linear.

Figure 43:
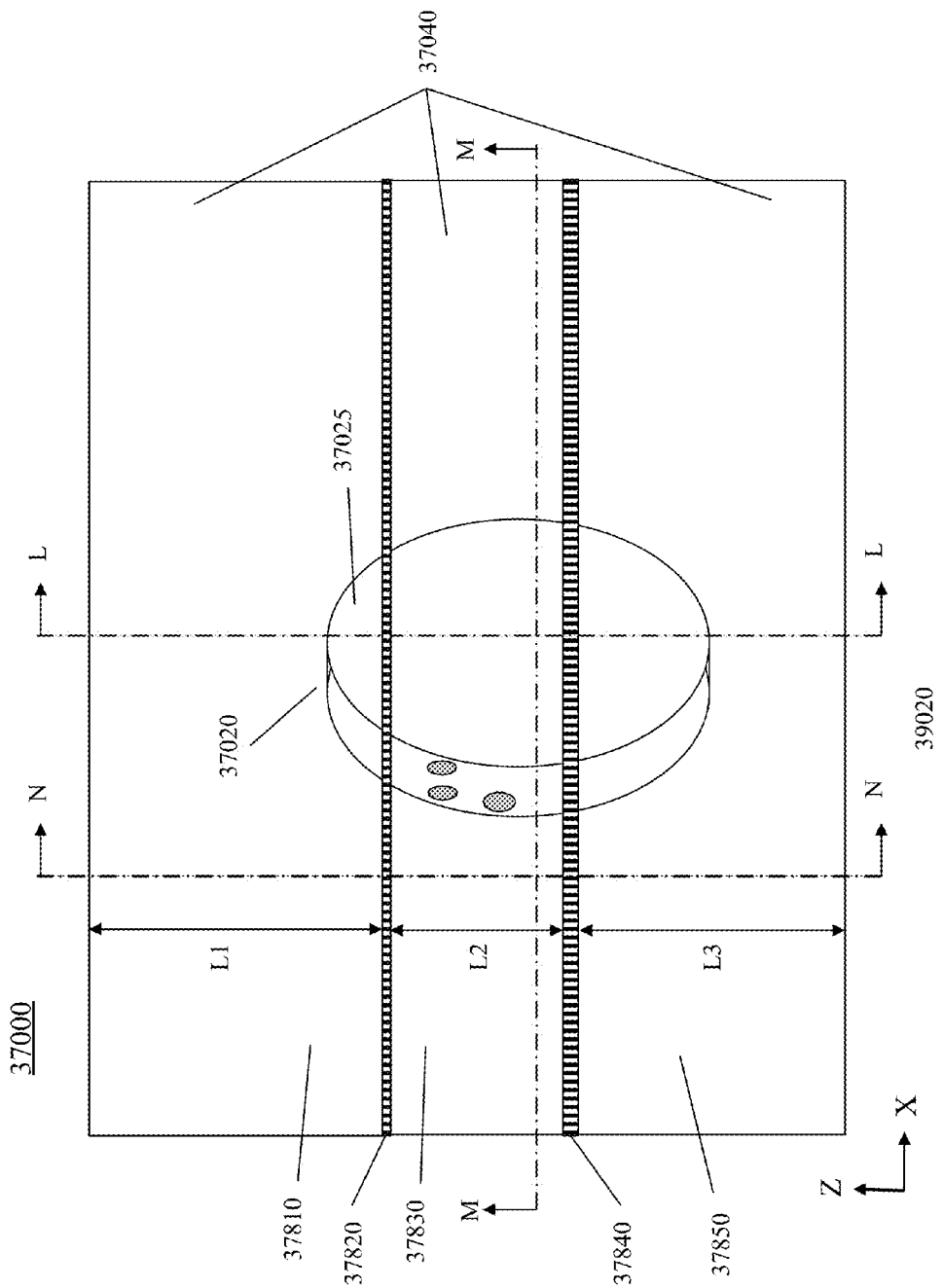
FIG. 43 presents a top view of an exemplary embodiment of a portion of generalized form 37000.

FIG. 43 presents a top view (i.e., looking down the Y axis) of an exemplary embodiment of a portion of generalized form 37000 comprising prong 37020 protruding from base 37040, and showing prong terminus 37025. As measured in the Z direction, zone 37810 need not have the same width L1 as width L2 of zone 37830 and/or width L3 of zone 37850.

Figure 44:
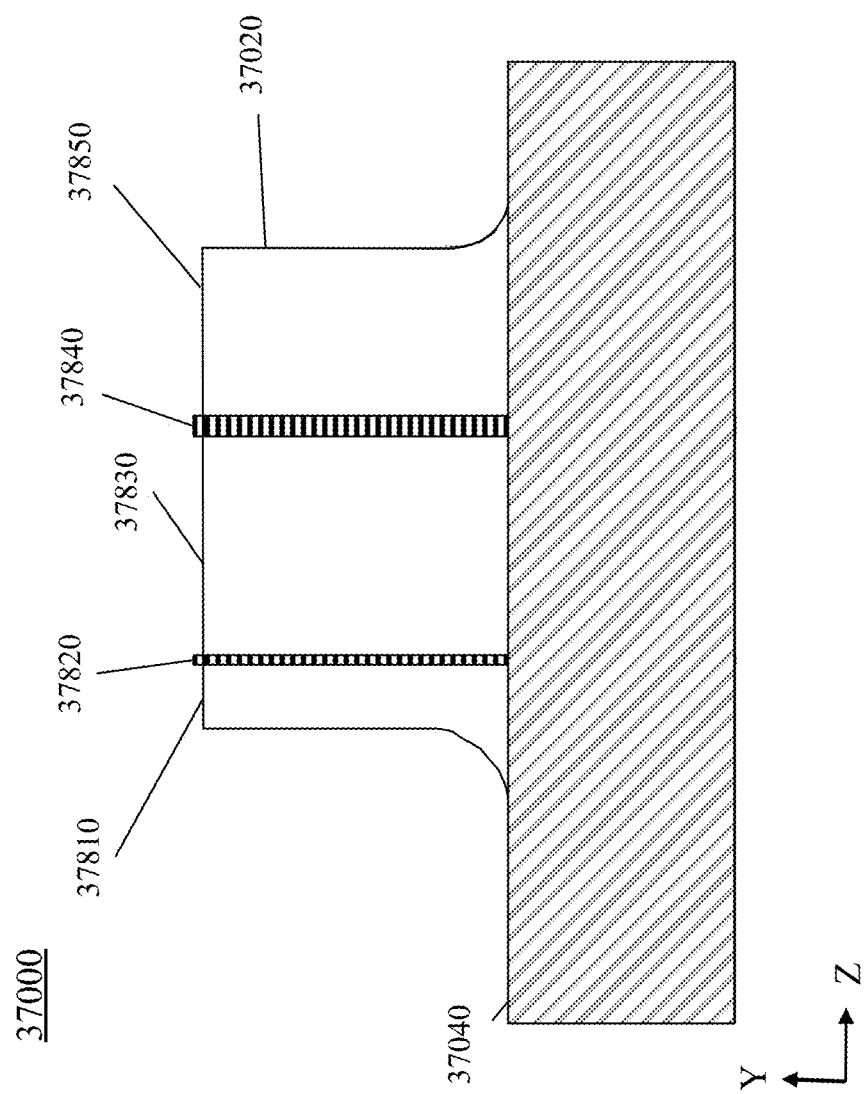
FIG. 44 presents a cross-sectional view of generalized form 37000 taken at section N-N of FIG. 42.

FIG. 44 presents a cross-sectional view (i.e., looking down the X axis) of generalized form 37000 taken at section N-N of FIG. 42, and showing that artifacts 37820, 37840 need not extend beyond a surface of prong 37020 and/or into the material of base 37040.

Figure 45:
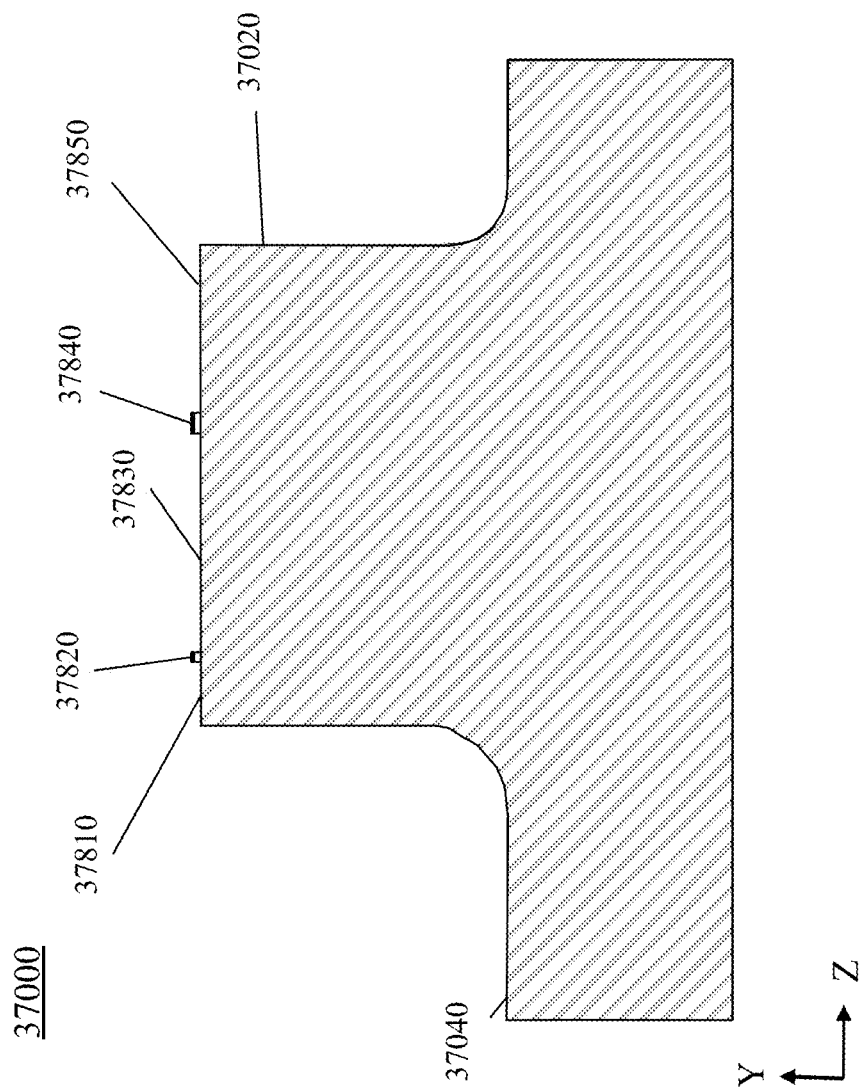
FIG. 45 presents a cross-sectional view of generalized form 37000 taken at section L-L of FIG. 39 and/or FIG. 42.

FIG. 45 presents a cross-sectional view (i.e., looking down the X axis) of generalized form 37000 taken at section L-L of FIG. 39 and/or FIG. 42, and showing that artifacts 37820, 37840 need not extend beyond a surface of form 37000 and/or into the material of prong 37020 and/or base 37040.

Figure 46:
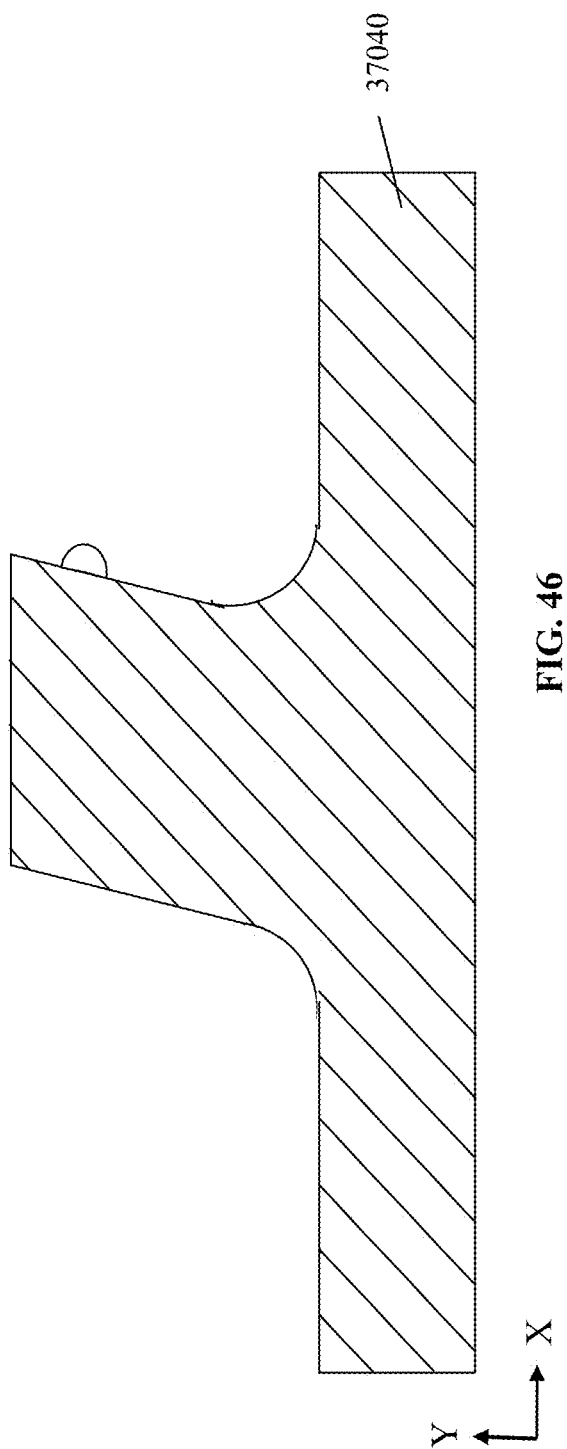
FIG. 46 presents a cross-sectional view of generalized form 37000 taken at section M-M of FIG. 40 and/or FIG. 42.

FIG. 46 presents a cross-sectional view (i.e., looking down the Z axis) of generalized form 37000 taken at section M-M of FIG. 40 and/or FIG. 42, and showing no artifacts.

Figure 47:
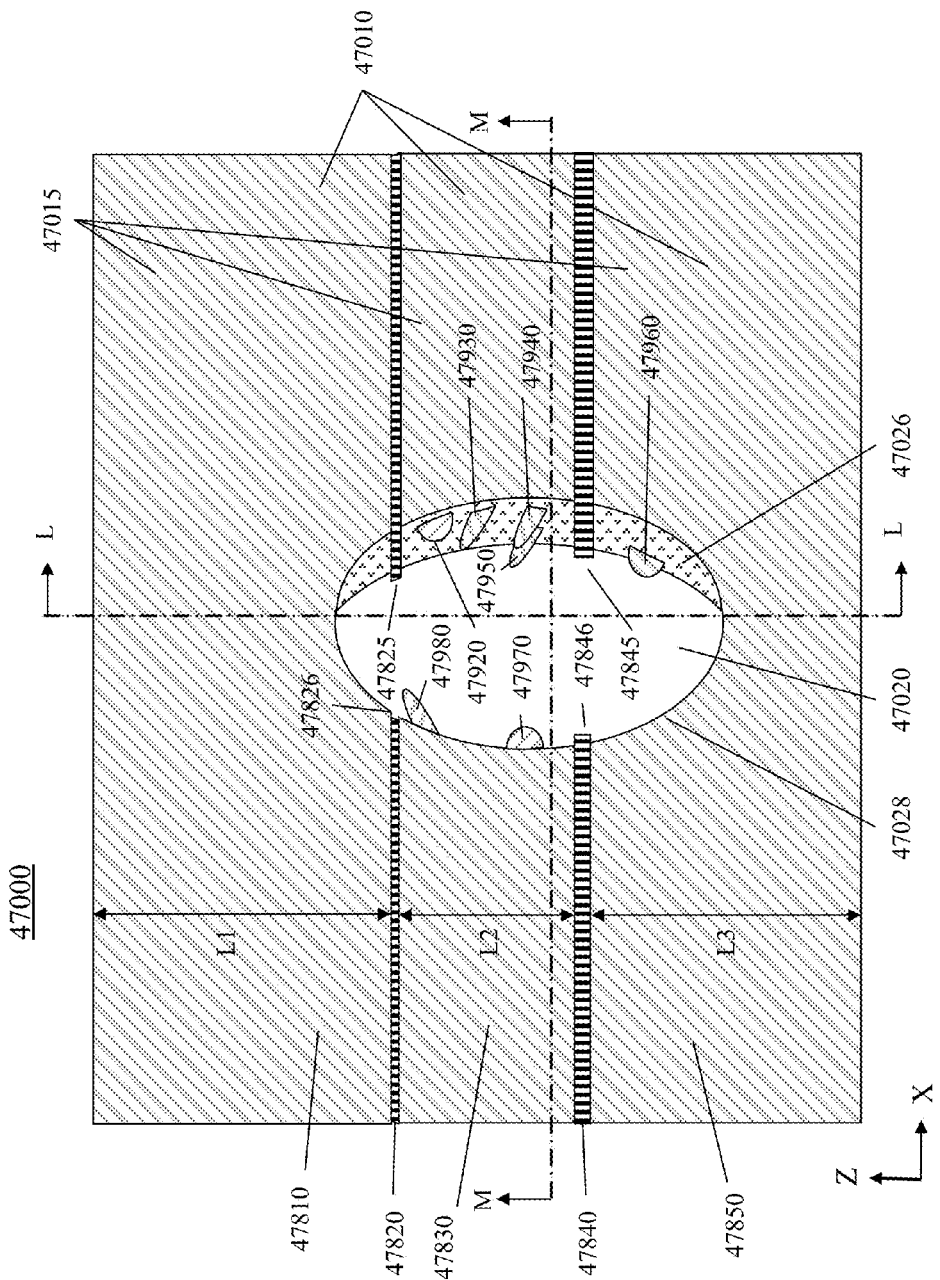
FIG. 47 presents a top view of generalized cast product 47000.

FIG. 47 presents a top view (i.e., looking down the Y axis) of generalized cast product 47000, which can be cast from generalized form 37000 of FIG. 43, and showing hole 47020, which can be formed by prong 37020 and/or defined through substrate 47010. Depending on the periphery and/or cross-sectional shape of prong 37020, hole 47020 can have nearly any castable periphery and/or cross-sectional shape 47028. Artifacts 47820, 47840 can replicate artifacts 37820, 37840, and can extend across a surface 47015 of substrate 47010 (thereby dividing surface 47015 into zones 47810, 47830, and 47850) and along hole sidewall 47026. Depending on the precise size and/or misalignments of the layers in the ancestor mold, artifacts can protrude from hold sidewall 47026 (as shown at protrusions 47825, 47845, 47846) and/or be indented into it (as shown at indentation 47826). Protrusions 47920, 47930, 47940, 47950, 47960, 47970, 48980 can extend from hole sidewall 47026.

Figure 48:
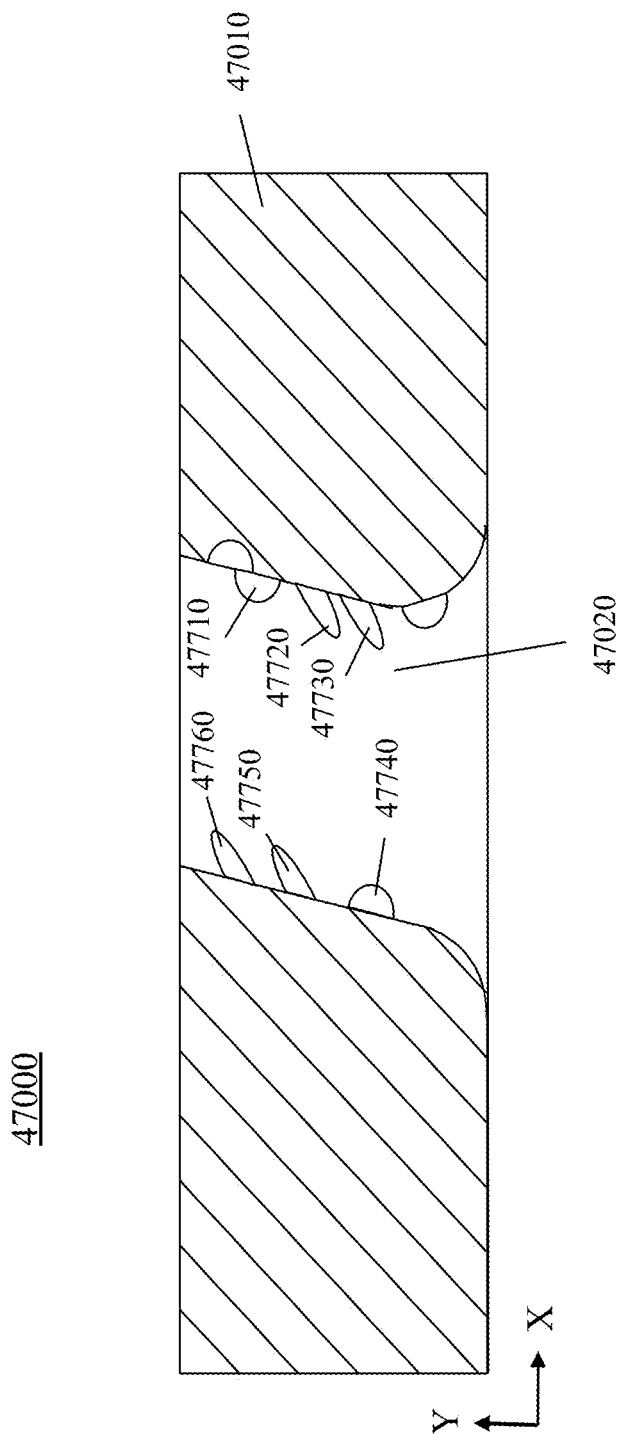
FIG. 48 presents a cross-sectional view taken at section L-L of FIG. 47.

FIG. 48 presents a cross-sectional view (i.e., looking down the Z axis and taken at section L-L of FIG. 47) of generalized cast product 47000, which can be cast from generalized form 37000 of FIG. 43, and showing hole 47020 (which can be defined by prong 37020) defined through substrate 47010. Artifacts 47820 and 47840 can extend across a top surface 47015 of substrate 47010 to divide substrate 47010 into zones 47810, 47830, and 47850.

Depending on the shape of the form and/or prongs utilized, a cast product and/or the holes formed in it can take on nearly any corresponding shape. Exemplary cross-sectional shapes of such holes are shown in FIGS. 24-29.

Certain exemplary embodiments can provide a device, such as a first form, such as a ceramic and/or wax first form that can comprise:
  a first plurality of surface artifacts; and
  a first plurality of surface artifacts that are integral to the first form;
  a first plurality of surface artifacts that substantially spatially replicate a surface geometry of a first stacked foil mold; and/or
  a first prong that:
    has a predominantly ceramic composition;
    that is integral to the first form;
    is adapted to form a first hole in a metallic cast product;
    is adapted to form a first hole in a metallic cast product that is cast in a molten state substantially around the first prong;
    is adapted to disintegrate;
    is adapted to structurally disintegrate;
    is adapted to substantially structurally disintegrate;
    is adapted to substantially structurally disintegrate due to thermal stresses;
    is adapted to substantially structurally disintegrate due to stresses imparted on the first prong;
    is adapted to substantially structurally disintegrate due to thermal stresses imparted on the first prong as the metallic cast product cools from a molten state to a solid state;
    defines a prong longitudinal axis;
    defines a fillet at an intersection of the first form and the first prong;
    defines a fillet at an intersection of the first form and the first prong, the fillet that is integral to the first prong and the first form;
    defines a fillet at an intersection of the first form and the first prong, the fillet defining a first midpoint fillet depth;
    defines a fillet at an intersection of the first form and the first prong, the fillet defining a first midpoint fillet depth measured in a first plane;
    defines a fillet at an intersection of the first form and the first prong, the fillet defining a first midpoint fillet depth measured in a first plane that contains the prong longitudinal axis;
    defines a fillet at an intersection of the first form and the first prong, the fillet defining a second midpoint fillet depth;
    defines a fillet at an intersection of the first form and the first prong, the fillet defining a second midpoint fillet depth measured in a second plane;
    defines a fillet at an intersection of the first form and the first prong, the fillet defining a second midpoint fillet depth measured in a second plane that contains the prong longitudinal axis;
    defines a fillet at an intersection of the first form and the first prong, the fillet defining a second midpoint fillet depth measured in a second plane that contains the prong longitudinal axis, the first plane separated from the second plane by a predetermined angle; and/or
    defines a fillet at an intersection of the first form and the first prong, the fillet defining a second midpoint fillet depth measured in a second plane that contains the prong longitudinal axis, the first plane separated from the second plane by a predetermined angle measured perpendicular to the prong longitudinal axis;
  wherein:
    the first midpoint fillet depth is measured at a longitudinal midpoint;
    the first midpoint fillet depth is measured at a longitudinal midpoint located approximately halfway between a first prong transition and a first form transition;
    the first midpoint fillet depth is measured at a longitudinal midpoint located approximately halfway between a first prong transition that is located where the fillet substantially blends into the first prong in the first plane and a first form transition that is located where the fillet substantially blends into the first form in the first plane;
    the second midpoint fillet depth is measured at a longitudinal midpoint;
    the second midpoint fillet depth is measured at a longitudinal midpoint located approximately halfway between a second prong transition and a second form transition;
    the second midpoint fillet depth is measured at a longitudinal midpoint located approximately halfway between a second prong transition that is located where the fillet substantially blends into the first prong in the second plane and a second form transition that is located where the fillet substantially blends into the first form in the second plane;

an external surface of the fillet is defined by an external surface of the form and an exterior surface of the first prong;

the cast product is at least a portion of an airfoil;

the first form defines at least a portion of a ceramic core;

the first form defines at least a portion of a wax mold;

at least a portion of the first form is adapted to be replaced by a molten metallic alloy;

at least a portion of the first form is adapted to be replaced by a molten metallic alloy that, upon solidification, creates at least a portion of the cast product;

the cast product is adapted to be cast substantially around the form;

the cast product is adapted to be cast substantially within the form;

the first prong is adapted to be destructively removed from the cast product;

the first prong extends outwardly with respect to a predetermined axis of the first form;

the first prong extends inwardly with respect to a predetermined axis of the first form;

the first prong extends outwardly with respect to a predetermined axis of the first form toward a second prong;

the first prong extends outwardly with respect to a predetermined axis of the first form toward a second prong that extends inwardly from a shell or mold;

the first prong extends inwardly with respect to a predetermined axis of the first form toward a second prong;

the first prong extends inwardly with respect to a predetermined axis of the first form toward a second prong that extends outwardly with respect to a predetermined axis of a core;

the first hole is a cooling hole;

the first hole is a through hole;

the first hole is a blind hole;

the first hole is adapted to be finished via a machining technique;

the first prong is adapted to extend from the form toward a predetermined target feature in a wax pattern;

the first prong is adapted to extend from the form toward a predetermined target feature in a shell;

the first prong is adapted to extend from the form toward a predetermined target feature in a wax pattern or shell;

the first hole is adapted to extend from a wax pattern toward a predetermined target feature in a core;

the first hole is adapted to extend from a wax pattern toward a predetermined target feature in a shell;

the first hole is adapted to extend from a wax pattern toward a predetermined target feature in a core or shell;

the first prong is one of an array of prongs;

the first prong is one of an array of prongs defined by and integral to the first form;

the first prong is coated with a predetermined material;

the first prong is a composite structure;

the first prong is a reinforced structure;

the first prong is a composite, reinforced structure;

the first prong is consumable;

the first prong defines a first hole entry;

the first prong defines a first hole exit that has a predetermined curvature;

the first prong defines a first hole entry and/or exit that has a predetermined curvature;

the first prong defines a first hole cross-section;

the first prong defines a first hole cross-section that, at a predetermined depth of the first hole, is round;

the first prong defines a first hole cross-section that, at a predetermined depth of the first hole, is not round;

the first prong defines:
  a first prong periphery that has a first predetermined shape;
  a first prong periphery that has a first predetermined shape as measured in a first predetermined longitudinal cross-sectional plane of the first prong;
  a first prong periphery that has a first predetermined shape as measured in a first predetermined longitudinal cross-sectional plane of the first prong that intersects a first predetermined position along the prong longitudinal axis;
  a second prong periphery that has a second predetermined shape;
  a second prong periphery that has a second predetermined shape as measured in a second predetermined longitudinal cross-sectional plane of the first prong;
  a second prong periphery that has a second predetermined shape as measured in a second predetermined longitudinal cross-sectional plane of the first prong that intersects a second predetermined position along the prong longitudinal axis; and/or
  the first predetermined shape differs from the second predetermined shape;

the first prong defines:
  a first prong cross-sectional area;
  a first prong cross-sectional area that is measured in a first predetermined longitudinal cross-sectional plane of the first prong;
  a first prong cross-sectional area that is measured in a first predetermined longitudinal cross-sectional plane of the first prong that intersects a first predetermined position along the prong longitudinal axis;
  a second prong cross-sectional area;
  a second prong cross-sectional area that is measured in a second predetermined longitudinal cross-sectional plane of the first prong;
  a second prong cross-sectional area that is measured in a second predetermined longitudinal cross-sectional plane of the first prong that intersects a second predetermined position along the prong longitudinal axis; and/or
  the first prong cross-sectional area differs from the second prong cross-sectional area;

the prong longitudinal axis is not perpendicular to a longitudinal axis of the first form;

the prong longitudinal axis is curved with respect to a longitudinal axis of the first form;

the cast product defines a counter-sunk and/or moat-like region adjacent an entrance of the first hole;

the cast product defines a counter-sunk and/or moat-like region adjacent an exit of the first hole;

the cast product defines a counter-sunk and/or moat-like region adjacent an entrance and/or exit of the first hole;

the first prong defines a fiducial on a sidewall of the first hole and/or a bottom of the first hole;

the first prong defines a fiducial on a sidewall of the first hole and/or a bottom of the first hole, the fiducial adapted to locate a second hole and/or align a traditional machining technique with the first hole;

the first prong defines a channel connecting the first hole to a second hole;

the first prong defines a channel connecting the first hole to a second hole, that channel potentially extending between the first hole and the second hole;

the first prong defines a channel connecting the first hole to a second hole, that channel potentially extending between the first hole and the second hole at any position along a length of the first hole;

an outer surface of the first prong defines a stress, fatigue, and/or crack reduction feature;

an outer surface of the first prong defines a predetermined surface geometry;

an outer surface of the first prong defines a predetermined surface roughness;

an outer surface of the first prong is dimpled;

the first prong defines a hole wall comprising filtering projections;

the first prong defines a hole wall comprising a filtering feature;

the first prong defines a hole wall comprising blind pockets;

the first form comprises a rubber liner attached to a metal base;

the first form comprises a rubber liner adapted to define a shape of the first form;

the first form comprises a rubber liner comprising a second plurality of surface artifacts;

the first form comprises a rubber liner comprising a second plurality of surface artifacts that are integral to the liner;

the first form comprises a rubber liner comprising a second plurality of surface artifacts that substantially spatially mirror a surface of a second stacked foil mold;

the first form comprises a rubber liner attached to a metal base, the liner adapted to define a shape of the first form, the liner comprising a second plurality of surface artifacts that are integral to the liner and that substantially spatially mirror a surface of a second stacked foil mold;

the cast product defines a plurality of inner cavities;

the cast product defines a pair of inner cavities that are interconnected via one or more passages;

the first plurality of surface artifacts invertedly spatially replicate the surface geometry of the first stacked foil mold;

the ceramic composition is adapted to undergo a crystal structure change prior to the metallic cast product being cast around the first prong; and/or the first plurality of surface artifacts comprise at least one protruding undercut.

Certain exemplary embodiments can provide a device, such as a cast product, such as a metallic cast product that can comprise:

a first plurality of surface artifacts;

a first plurality of surface artifacts that are integral to the cast product;

a first plurality of surface artifacts that substantially spatially replicate a surface geometry of a stacked foil mold;

a first plurality of surface artifacts that are integral to the cast product and substantially spatially replicate a surface geometry of a stacked foil mold;

a product surface that defines a first hole;

a product surface that defines a first hole, the first hole defining a hole longitudinal axis;

a product surface that defines a first hole, the first hole defining a hole longitudinal axis, an intersection of the product surface and a wall of the first hole defining a depth of the first hole;

a product surface that defines a first hole, the first hole defining a hole longitudinal axis, an intersection of the product surface and a wall of the first hole defining a fillet, the fillet defining a first midpoint fillet depth;

a product surface that defines a first hole, the first hole defining a hole longitudinal axis, an intersection of the product surface and a wall of the first hole defining a fillet that is integral to the product;

a product surface that defines a first hole, the first hole defining a hole longitudinal axis, an intersection of the product surface and a wall of the first hole defining a fillet that defines a first midpoint fillet depth;

a product surface that defines a first hole, the first hole defining a hole longitudinal axis, an intersection of the product surface and a wall of the first hole defining a fillet that defines a first midpoint fillet depth measured in a first plane that contains the hole longitudinal axis;

a product surface that defines a first hole, the first hole defining a hole longitudinal axis, an intersection of the product surface and a wall of the first hole defining a fillet that defines a first midpoint fillet depth measured in a first plane that contains the hole longitudinal axis, the fillet defining a second midpoint fillet depth measured in a second plane that contains the hole longitudinal axis; and/or a product surface that defines a first hole, the first hole defining a hole longitudinal axis, an intersection of the product surface and a wall of the first hole defining a fillet that defines a first midpoint fillet depth measured in a first plane that contains the hole longitudinal axis, the fillet defining a second midpoint fillet depth measured in a second plane that contains the hole longitudinal axis, the first plane separated from the second plane by a predetermined angle measured perpendicular to the hole longitudinal axis.

Certain exemplary embodiments can provide a method that can comprise:

casting a cast product;

casting a cast product within a first portion of a ceramic investment casting mold;

casting a cast product within a first portion of a wax investment casting mold;

casting a cast product within a first portion of a ceramic or wax investment casting mold;

wherein:

at least one of the first portion and the second portion is a first form;

at least one of the first portion and the second portion is a first form comprising:

a first plurality of surface artifacts;

a first plurality of surface artifacts that are integral to the first form;

a first plurality of surface artifacts that are integral to the first form and that substantially spatially replicate a surface geometry of a first stacked foil mold; and/or a first prong that:

has a predominantly ceramic composition;

that is integral to the first form;

is adapted to form a first hole in a metallic cast product;

is adapted to form a first hole in a metallic cast product that is cast in a molten state substantially around the first prong;
is adapted to disintegrate;
is adapted to structurally disintegrate;
is adapted to substantially structurally disintegrate;
is adapted to substantially structurally disintegrate due to thermal stresses;
is adapted to substantially structurally disintegrate due to stresses imparted on the first prong;
is adapted to substantially structurally disintegrate due to thermal stresses imparted on the first prong as the metallic cast product cools from a molten state to a solid state;
defines a prong longitudinal axis;
defines a fillet at an intersection of the first form and the first prong;
defines a fillet at an intersection of the first form and the first prong, the fillet that is integral to the first prong and the first form;
defines a fillet at an intersection of the first form and the first prong, the fillet defining a first midpoint fillet depth;
defines a fillet at an intersection of the first form and the first prong, the fillet defining a first midpoint fillet depth measured in a first plane;
defines a fillet at an intersection of the first form and the first prong, the fillet defining a first midpoint fillet depth measured in a first plane that contains the prong longitudinal axis;
defines a fillet at an intersection of the first form and the first prong, the fillet defining a second midpoint fillet depth;
defines a fillet at an intersection of the first form and the first prong, the fillet defining a second midpoint fillet depth measured in a second plane;
defines a fillet at an intersection of the first form and the first prong, the fillet defining a second midpoint fillet depth measured in a second plane that contains the prong longitudinal axis;
defines a fillet at an intersection of the first form and the first prong, the fillet defining a second midpoint fillet depth measured in a second plane that contains the prong longitudinal axis, the first plane separated from the second plane by a predetermined angle; and/or
defines a fillet at an intersection of the first form and the first prong, the fillet defining a second midpoint fillet depth measured in a second plane that contains the prong longitudinal axis, the first plane separated from the second plane by a predetermined angle measured perpendicular to the prong longitudinal axis.

DEFINITIONS

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

3-dimensional/three-dimensional—involving or relating to three mutually orthogonal dimensions and/or definable via coordinates relative to three mutually perpendicular axes.
a—at least one.
account—to accommodate, adjust for, and/or take into consideration.
activity—an action, act, step, and/or process or portion thereof
adapted to—suitable, fit, and/or capable of performing a specified function.
adjacent—in close proximity to, near, next to, and/or adjoining
after—subsequent to.
air foil—a body, cross-section of a body, and/or surface designed to develop a desired force by reaction with a fluid that is flowing across the surface. The cross sections of wings, propeller blades, windmill blades, compressor and turbine blades in a jet engine, and hydrofoils on a high-speed ship are examples of airfoils.
align—to adjust substantially into a proper orientation and/or location with respect to another thing and/or to place objects such that at least some of their faces are in line with each other and/or so that their centerlines are on the same axis.
all—an entirety of a set.
alloy—an amalgam, homogeneous mixture, and/or solid solution of a metal and a non-metal, and/or of two or more metals, the atoms of one replacing or occupying interstitial positions between the atoms of the other.
along—through, on, beside, over, in line with, and/or parallel to the length and/or direction of; and/or from one end to the other of
alumina—aluminum oxide and/or $Al_2O_3$.
amount—a quantity.
ancestor—an entity from which another entity is descended; a forebear, forerunner, predecessor, and/or progenitor.
and—in conjunction with.
and/or—either in conjunction with or in alternative to.
angle—a measure of rotation and/or inclination between a ray and a reference ray and/or plane.
any—one, some, every, and/or all without specification.
aperture—an opening, hole, gap, passage, and/or slit.
apparatus—an appliance and/or device for a particular purpose.
applying—to put to use for a purpose.
approximately—about and/or nearly the same as.
are—to exist.
area—the measure of the space within a 2-dimensional region.
around—about, surrounding, and/or on substantially all sides of
array—an arrangement of multiple units, usually ordered; an array may be organized in linear, curvilinear, flat, and/or 3-dimensional positioning of the multiple units.
artifact—structural evidence indicative of one or more molds from which a molded object descended.
associate—to join, connect together, accompany, and/or relate.
associated with—related to.
at—in, on, and/or near.
at least—not less than, and possibly more than.
attach—to fasten, secure, couple, and/or join.
automatically—acting or operating in a manner essentially independent of external influence or control. For example, an automatic light switch can turn on upon "seeing" a person in its view, without the person manually operating the light switch.

axis—a straight line about which a body and/or geometric object rotates and/or can be conceived to rotate and/or a center line to which parts of a structure and/or body can be referred.

base—a supporting and/or mounted portion of an item.

be—to exist in actuality.

between—in a separating interval and/or intermediate to.

bind—to combine chemically or form a chemical bond.

binder—a substance and/or something used to bind separate particles together and/or facilitate adhesion.

blade—an arm of a rotating mechanism.

blend—to visually, spatially, and/or physically combine, unite, mix, mingle, fuse, meld, and/or merge into one.

blind hole—a hole that is not a through-hole and/or does not to all the way through something.

bottom—a lowermost and/or innermost point.

bound—to limit an extent.

by—via and/or with the use or help of.

can—is capable of, in at least some embodiments.

cast—(n) the process and/or act of casting; (adjective) formed in a mold; (v) to form (e.g., wax, liquid polymer, and/or liquid metal, etc.) into a particular shape by pouring into a mold and allowing to solidify within the mold prior to removal from the mold.

cause—to bring about, provoke, precipitate, produce, elicit, be the reason for, result in, and/or effect.

cavity—a hollow area within an object.

ceramic—any of various hard, brittle, heat-resistant, and corrosion-resistant materials made by shaping and then firing a nonmetallic mineral, such as clay, at a high temperature, and/or the nonmetallic mineral from which such materials can be formed, such as, for example, silica, silicon carbide, alumina, zirconium oxide, and/or fused silica, calcium sulfate, luminescent optical ceramics, bio-ceramics, and/or plaster, etc.

change—(v.) to cause to be different; (n.) the act, process, and/or result of altering or modifying.

channel—a defined passage, conduit, and/or groove for conveying one or more fluids.

characterize—to define, describe, classify, and/or constrain the qualities, characteristics, and/or peculiarities of circular—round and/or having the shape of a circle.

close—to move (a door, for example) so that an opening or passage is covered and/or obstructed; to shut; and/or to draw and/or bind together.

coat—(v) to apply a thin layer of material to cover at least a portion of a surface of something. In some cases, upon application, a mechanical, physical, and/or chemical attachment, bond, and/or interaction can form between the materials. Examples include conventional coating processes such as spraying and/or dipping; vacuum deposition techniques; and/or such surface-modification technologies as diffusion, laser and/or plasma processes, chemical plating, grafting and/or bonding, hydrogel encapsulation, and/or bombardment with high-energy particles.

component—a constituent element and/or part.

composite—a product made of diverse materials, each of which is identifiable, at least in part, in the final product.

composition—a composition of matter and/or an aggregate, mixture, compound, reaction product, and/or result of combining two or more substances.

compressive—pertaining to forces on a body or part of a body that tend to crush and/or compress the body.

comprised—included in; a part of.

comprises—includes, but is not limited to, what follows.

comprising—including but not limited to.

concentration—a measure of the amount of dissolved substance contained per unit of volume and/or the amount of a specified substance in a unit amount of another substance.

configure—to make suitable or fit for a specific use or situation.

connect—to link, join, and/or fasten together.

consumable—adapted to be destructively mechanically and/or chemically removed, destroyed, and/or decomposed.

containing—including but not limited to.

convert—to transform, adapt, and/or change.

cool—to reduce a temperature of a substance.

core—a substantially innermost and/or central, and potentially removable, object around which another material will be cast.

corresponding—related, associated, accompanying, similar in purpose and/or position, conforming in every respect, and/or equivalent and/or agreeing in amount, quantity, magnitude, quality, and/or degree.

countersink—to enlarge an opening region (entrance or exit) of a hole.

coupling—(n) a device adapted to join, connect, and/or link. (v) joining, connecting, and/or linking crack—A partial split or break and/or a fissure.

create—to make, form, produce, generate, bring into being, and/or cause to exist.

cristobalite—a crystalline form of silica that tends to be stable at high temperatures and/or a polymorph of quartz.

cross-link—to join (adjacent chains of a polymer or protein) by creating covalent bonds.

cross-section—a section formed by a plane cutting through an object at a right angle to an axis.

crystal structure change—a transition from one polymorph of a solid material to another.

curvature—the act of curving and/or or the state and/or degree of being curved and/or bent.

curved—smoothly bent, not linear, and/or to move in and/or take the shape of a curve.

cycloaliphatic—of, relating to, and/or being an organic compound that contains a ring but is not aromatic.

define—to establish the meaning, relationship, outline, form, and/or structure of; and/or to precisely and/or distinctly describe and/or specify.

demold—to remove from a mold.

densify—to increase the density of.

depth—an extent, measurement, and/or or dimension downward, backward, and/or inward.

derive—to obtain from a source.

desired—indicated, expressed, and/or requested.

destructively—of, relating to, and/or being a process that results in damage to the subject material and/or product and/or results in such damage that the subject material and/or product can not be re-used for its intended purpose.

determine—to obtain, calculate, decide, deduce, and/or ascertain.

device—a machine, manufacture, and/or collection thereof.

differ—to be unlike, dissimilar, separate, changed, and/or distinct in nature and/or quality.

digital—non-analog and/or discrete.

dimension—an extension in a given direction and/or a measurement in length, width, or thickness.

dimpled—having one or more slight depressions and/or indentations in a surface.

direction—a spatial relation between something and a course along which it points and/or moves; a distance independent relationship between two points in space that specifies the position of either with respect to the other; and/or a relationship by which the alignment and/or orientation of any position with respect to any other position is established.

disintegrate—to become reduced to components, fragments, and/or particles.

dissolve—to cause to pass into solution.

each—every one of a group considered individually.

embodiment—an implementation and/or a concrete representation of a concept.

entry—an opening, way in, and/or path leading through an opening and toward an interior.

epoxy—having the structure of an epoxide; of and/or containing an oxygen atom joined to two different groups that are themselves joined to other groups; any of a class of resins derived by polymerization from epoxides: used chiefly in adhesives, coatings, electrical insulation, solder mix, and/or castings; and/or any of various usually thermosetting resins capable of forming tight cross-linked polymer structures characterized by toughness, strong adhesion, and low shrinkage, used especially in surface coatings and adhesives.

exemplary—serving as a model.

exit—an egress, way out, a path leading through an opening and away from an interior of a container.

expected—predicted.

extend—to stretch, cover, span, and/or reach spatially outward.

extending—existing, spanning, covering, reaching, located, placed, and/or stretched lengthwise and/or in an indicated direction.

exterior—a region that is external and/or outside of a device and/or system.

external—exterior and/or relating to, existing on, and/or connected with the outside and/or or an outer part.

face—the most significant or prominent surface of an object.

facilitate—to encourage and/or allow.

fasten—to attach to something else and/or to hold something in place.

fatigue—the weakening or failure of a material resulting from prolonged stress.

feature—a prominent and/or distinctive aspect, structure, component, quality, and/or characteristic.

fiducial—a tactile and/or visual marking and/or reference point.

fill—to supply, introduce into, and/or put into a container, potentially to the fullest extent of the container.

fillet—a concave easing of an interior corner of a part, a substantially rounded corner, and/or an intersection between parts, the fillet adapted to: distribute stress over a broader area; effectively make the parts more durable and/or capable of bearing larger loads; and/or improve fluid dynamics (e.g., reduce drag and/or turbulence) at the corner and/or intersection. A fillet can be defined by one or more radii and/or one or more line segments.

filtering—adapted for straining out, capturing, and/or eliminating undesired solid and/or viscous material from a fluid.

finish—to bring to a desired and/or required state.

fire—to bake in a kiln and/or dry by heating.

first—an initial entity in an ordering of entities and/or immediately preceding the second in an ordering.

flat—having a substantially planar major face and/or having a relatively broad surface in relation to thickness or depth.

flatten—to make flat.

foil—a very thin, often flexible sheet and/of leaf, typically formed of metal.

form—(v) to construct, build, make, shape, produce, generate, and/or create; (n) a phase, structure, and/or appearance, and/or a first structure used to impart a spatial geometry on a second structure that is cast within and/or around the first structure.

formations—concave and/or convex elements on a surface; dimples; and/or protrusions.

from—used to indicate a source.

further—in addition.

generate—to create, produce, render, give rise to, and/or bring into existence.

geometry—a three-dimensional arrangement, configuration, and/or shape.

halfway—midway between; at and/or near the middle and/or midpoint.

handling—of and/or relating to manual (and/or mechanical) carrying, moving, delivering, and/or working with something.

has—possesses, comprises, and/or is characterized by.

having—possessing, characterized by, and/or comprising.

heating—transferring energy from one substance to another resulting in an increase in temperature of one substance.

hole—an aperture, opening, perforation, pore, tunnel, chamber, cavity, pit, cranny, depression, and/or hollowed place in an object.

hole wall—a surface of material that defines and/or at least partially encloses a hole.

impart—to transmit, impose, convey, provide, and/or contribute including—having, but not limited to, what follows.

incorporating—causing to comprise.

ingredient—an element and/or component in a mixture, compound, and/or composition.

inner—closer than another to the center and/or middle.

insert—to put or introduce into.

install—to connect or set in position and prepare for use.

integral—formed or united into another entity.

inter-connecting—joined and/or fastened together reciprocally and/or with each other.

interact—to act on each other.

interconnected—connected internally.

interface—(n) a boundary across which two independent systems meet and act on and/or communicate with each other. (v) to connect with and/or interact with by way of an interface.

interlock—(v) to fit, connect, unite, lock, and/or join together and/or closely in a non-destructively and/or destructively releasable manner; (n) a device for non-destructively and/or destructively releasably preventing substantial relative motion between two elements of a structure.

intersection—a point and/or line segment defined by the meeting of two or more items.

into—to a condition, state, or form of and/or toward, in the direction of, and/or to the inside of invert—to reverse the position, order, condition, nature, and/or effect of invertedly—in an reversed and/or opposing position, order, condition, nature, and/or effect.

investment casting—a forming technique and/or process that offers repeatable production of net shape components, typically with minutely precise details, from a variety of initially molten metals and/or high-performance alloys.

investment material—a material from which investment castings are formed.

inwardly—toward, internally, within, and/or not outwardly.

is—to exist in actuality.

laminate—to construct from layers of material bonded together.

lamination—a bonded, adhered, and/or attached structure and/or arrangement, typically formed of thin sheets; and/or a laminated structure and/or arrangement.

layer—a single thickness of a material covering a surface or forming an overlying part or segment; a ply, strata, and/or sheet.

layer-less—not formed of, and/or lacking a collection and/or stack of, plies, strata, and/or sheets.

less than—having a measurably smaller magnitude and/or degree as compared to something else.

ligament—a connecting member such as a wall, beam, and/or rib.

liner—a sleeve, coating, and/or overlay.

link—(n) a chemical bond, such as a covalent bond; (v) to bond chemically, such as via covalent bond.

locate—to place, position, and/or situate in a particular spot, region, and/or position.

logical—a conceptual representation.

longitudinal—of and/or relating to a length; placed and/or running lengthwise.

longitudinal axis—a straight line defined parallel to an object's length and passing through a centroid of the object.

machining—the process of cutting, shaping, and/or finishing by machine, including, e.g., milling, cutting, turning, boring, drilling, abrading, broaching, filing, sawing, punching, blanking, and/or planing.

major—relatively great in size or extent.

make—to create, generate, build, and/or construct.

marking—a discernable symbol and/or an act of denoting by a discernable symbol.

mate—to join closely and/or pair.

material—a substance and/or composition.

may—is allowed and/or permitted to, in at least some embodiments.

measured—determined, as a dimension, quantification, and/or capacity, etc. by observation.

metal—any of a category of electropositive elements that usually have a shiny surface, are generally good conductors of heat and electricity, and can be melted or fused, hammered into thin sheets, or drawn into wires; an element yielding positively charged ions in aqueous solutions of its salts; a free metallic element (e.g., lithium), an alloy of two or more metals (e.g., 25% Na 75% K), an intermetallic compound (e.g., AlNi), and/or a mere mixture of particles of two or more metals; and/or, as found in the periodic table of the elements, any element not named in the following listing, all group VIII, VIIB, and VIB elements except polonium, nitrogen, phosphorus, carbon, silicon, and boron.

metallic—relating to, comprising, consisting essentially of, and/or composed substantially of one or more metals.

method—one or more acts that are performed upon subject matter to be transformed to a different state or thing and/or are tied to a particular apparatus, said one or more acts not a fundamental principal and not pre-empting all uses of a fundamental principal.

micro-features—irregularities, such as ridges and/or valleys, forming a roughness average on a surface of between approximately 1 microns and approximately 500 microns.

midpoint—a point of a line segment and/or or curvilinear arc that divides it into two parts of substantially the same length; and/or a position midway between two extremes.

misaligned—to place out of alignment and/or to offset.

mix—to create and/or form by combining and/or blending ingredients.

moat-like—resembling and/or having the physical properties of a ditch and/or channel surrounding an object.

model—a mathematical and/or schematic description of an entity and/or system.

mold—(n) a substantially hollow form, cavity, and/or matrix into and/or on which a molten, liquid, and/or plastic composition is placed and from which that composition takes form in a reverse image from that of the mold; (v) to shape and/or form in and/or on a mold.

molecule—the smallest particle of a substance that retains the chemical and physical properties of the substance and is composed of two or more atoms; and/or a group of like or different atoms held together by chemical forces.

molten—melted and/or made liquid via the application of heat.

monolithic—constituting and/or acting as a single, substantially uniform and/or unbroken, whole.

more—a quantifier meaning greater in size, amount, extent, and/or degree.

node—a junctions and/or intersection of a plurality of non-co-linear ligaments.

non—not.

not—a negation of something.

nozzle—a burner structured and/or utilized such that combustible gas issues therefrom to form a steady flame; a short tube, usually tapering, forming the vent of a pipe-like structure; and/or a component that produces thrust by converting the thermal energy of hot chamber gases into kinetic energy and directing that energy along the nozzle's longitudinal axis.

offsetably—characterized by a misalignment, jog, and/or short displacement in an otherwise parallel and/or straight orientation and/or arrangement.

one—being or amounting to a single unit, individual, and/or entire thing, item, and/or object.

open—to release from a closed and/or fastened position, to remove obstructions from, and/or to clear.

or—used to indicate alternatives, typically appearing only before the last item in a group of alternative items.

orthogonal—perpendicular.

outer—farther than another from the center and/or middle.

outwardly—toward an outer surface and/or circumference of overlappingly—characterized by extending over and covering a part of something else.

pair—a quantity of two of something.

parallel—of, relating to, or designating lines, curves, planes, and/or or surfaces everywhere equidistant and/or an arrangement of components in an electrical circuit that splits an electrical current into two or more paths.

parent—an entity from which another is descended; and/or a source, origin, and/or cause.

part—component.

particle—a small piece or part. A particle can be and/or be comprised by a powder, bead, crumb, crystal, dust, grain, grit, meal, pounce, pulverulence, and/or seed, etc.

passage—a path, tunnel, hole, channel, and/or duct through, over, and/or along which something may pass.

pattern—a replica of an object to be cast and/or around which a mold is constructed.

percent—one part in one hundred.

perceptible—capable of being perceived by the human senses.

periphery—the outer limits, surface, and/or boundary of a surface, area, and/or object.

perpendicular—intersecting at and/or forming substantially right angles.

photolithography—a process whereby metallic foils, fluidic circuits, and/or printed circuits can be created by exposing a photosensitive substrate to a pattern, such as a predesigned structural pattern and/or a circuit pattern, and chemically etching away either the exposed or unexposed portion of the substrate.

physical—tangible, real, and/or actual.

physically—existing, happening, occurring, acting, and/or operating in a manner that is tangible, real, and/or actual.

place—to put in a particular place and/or position.

planar—shaped as a substantially flat two-dimensional surface.

plane—a substantially flat surface and/or a surface containing all the straight lines that connect any two points on it.

plurality—the state of being plural and/or more than one.

pocket—a receptacle and/or cavity.

portion—a part, component, section, percentage, ratio, and/or quantity that is less than a larger whole. Can be visually, physically, and/or virtually distinguishable and/or non-distinguishable.

position—(n) a place and/or location, often relative to a reference point. (v) to place, orient, arrange, and/or locate.

potential—having possibility.

predetermined—established in advance.

predominantly—mostly.

present—to introduce, provide, show, display and/or offer for consideration.

prior—before product—something produced by human or mechanical effort or by a natural process.

projection—a protrusion and/or a thing and/or part that extends outward beyond a prevailing line and/or surface.

prong—a projecting part, such as a protrusion, bar, stub, rod, pin, cylinder, etc.

protrude—to bulge, jut, project, and/or extend in an indicated direction, outward, and/or into space.

protrusion—that which protrudes.

provide—to furnish, supply, give, convey, send, and/or make available.

pull—to remove from a fixed position, to extract, and/or to apply force to so as to cause and/or tend to cause motion toward the source of the force.

pull-plane—a plane along and/or perpendicular to which a cast device is adapted to be urged to withdraw the cast device from a mold without substantial damage to the cast device and/or mold.

radius—the length of a line segment between the center and circumference of a circle or sphere.

reduce—to make and/or become lesser and/or smaller.

reduction—a diminishment in magnitude.

region—an area and/or zone.

remove—to eliminate, remove, and/or delete, and/or to move from a place or position occupied.

repeatedly—again and again; repetitively.

replace—to provide a substitute and/or equivalent in the place of.

replicate—to copy, duplicate, depict, mirror, reflect, resemble, reproduce, and/or repeat something and/or to make a substantially identical and/or spatially inverted copy, duplicate, reproduction, and/or repetition of something.

resin—any of numerous physically similar polymerized synthetics and/or chemically modified natural resins including thermoplastic materials such as polyvinyl, polystyrene, and polyethylene, and thermosetting materials such as polyesters, epoxies, and silicones that are used with fillers, stabilizers, pigments, and/or other components to form plastics.

roughness—a texture of a surface and/or edge that is not smooth but instead is irregular and/or uneven.

round—circular.

rubber—an elastomeric material such as, for example, natural rubber, nitrile rubber, silicone rubber, acrylic rubber, neoprene, butyl rubber, flurosilicone, TFE, SBR, and/or styrene butadiene rubber, etc.

said—when used in a system or device claim, an article indicating a subsequent claim term that has been previously introduced.

scale—(n) a progressive classification, such as of size, amount, importance, and/or rank; (v) to increase or reduce proportionately in size.

second—immediately following the first in an ordering.

select—to make a choice or selection from alternatives.

separate—(n) distinct; (v) to disunite, space, set, or keep apart and/or to be positioned intermediate to.

set—a related plurality of predetermined elements; and/or one or more distinct items and/or entities having a specific common property or properties.

shape—(v) to apply a characteristic surface, outline, and/or contour to an entity; (n) a characteristic surface, outline, and/or contour of an entity.

shear—a deformation resulting from stresses that cause contiguous parts of a body to slide relatively to each other in a direction parallel to their plane of contact; a deformation of an object in which parallel planes remain parallel but are shifted in a direction parallel to themselves; "the shear changed the quadrilateral into a parallelogram".

sheet—a broad, relatively thin, surface, layer, and/or covering shell—an external, usually hard, protective and/or enclosing case and/or cover.

shrinkage—the process of shrinking and/or the amount or proportion by which something shrinks.

sidewall—a wall that forms a side of something.

silica—silicon dioxide ($SiO_2$), which is a hard, glossy, white, and/or colorless crystalline compound and/or mineral, which occurs naturally and/or abundantly as quartz, quartz, sand, flint, agate, and many other minerals, and used to manufacture a wide variety of materials, especially glass and concrete.

silicone—any of a class and/or group of chemical compounds and/or semi-inorganic polymers based on the structural unit $R_2SiO$, where R is an organic group and/or radical, such as a methyl ($CH_3$) group and/or a phenyl ($C_6H_5$) group, typically characterized by wide-range thermal stability, high lubricity, extreme water repellence, and/or physiological inertness, often used in adhesives, lubricants, protective coatings, paints, electrical insulation, synthetic rubber, and/or prosthetic replacements for body parts.

siloxane—any of a class of organic and/or inorganic chemical compounds of silicon, oxygen, and usually carbon and hydrogen, based on the structural unit $R_2SiO$, where R is an alkyl group, usually methyl.

simulated—created as a representation or model of another thing.

single—existing alone or consisting of one entity.

sinter—to cause (e.g., a ceramic and/or metallic powder) to form a coherent mass by heating without melting.

slice—(n) a thin broad piece cut from a larger three dimensional object; (v) to cut and/or divide a three dimensional object into slices.

solid—neither liquid nor gaseous, but instead of definite shape and/or form.

solidification—the process of becoming hard and/or solid by cooling, drying, and/or crystallization.

solvent—a substance in which another substance is dissolved, forming a solution; and/or a substance, usually a liquid, capable of dissolving another substance.

space—an area and/or volume.

spatial—relating to an area or volume.

spatially—existing or occurring in space.

split—to break, divide, and/or separate into separate pieces.

stack—(n) a substantially orderly pile and/or group, especially one arranged in and/or defined by layers; (v) to place and/or arrange in a stack.

state—a qualitative and/or quantitative description of condition.

store—to place, hold, and/or retain data, typically in a memory.

strength—a measure of the ability of a material to support a load; the maximum nominal stress a material can sustain; and/or a level of stress at which there is a significant change in the state of the material, e.g., yielding and/or rupture.

stress—an applied force or system of forces that tends to strain or deform a body and/or the internal resistance of that body to such an applied force or system of forces.

structure—the way in which parts are arranged and/or put together to form a whole; the interrelation or arrangement of parts in a complex entity; a makeup of a device, portion of a device, that which is complexly constructed; and/or a manner in which components are organized and/or form a whole.

sub-plurality—a subset.

substantially—to a considerable, large, and/or great, but not necessarily whole and/or entire, extent and/or degree.

sufficiently—to a degree necessary to achieve a predetermined result.

support—to bear the weight of, especially from below.

surface—a face, material layer, and/or outer boundary of a body, object, and/or thing.

surround—to encircle, enclose, and/or confine on several and/or all sides.

system—a collection of mechanisms, devices, machines, articles of manufacture, processes, data, and/or instructions, the collection designed to perform one or more specific functions.

tactile—perceptible to the sense of touch; able to be felt via the fingertip.

target—a destination.

technique—a method.

tensile—pertaining to forces on a body that tend to stretch, or elongate, the body. A rope or wire under load is subject to tensile forces.

terminate—to end.

that—a pronoun used to indicate a thing as indicated, mentioned before, present, and/or well known.

thermal—pertaining to temperature.

thermoform—to shape (especially plastic) by the use of heat and pressure.

thickness—the measure of the smallest dimension of a solid figure.

through—across, among, between, and/or in one side and out the opposite and/or another side of.

through-hole—a hole that extends completely through a substrate.

to—a preposition adapted for use for expressing purpose.

tool—something used to accomplish a task.

toward—used to indicate a destination and/or in a physical and/or logical direction of.

traditional—established, conventional, standard, orthodox, and/or customary, etc.

transform—to change in measurable: form, appearance, nature, and/or character.

transition—(v.) to pass, change, convert, and/or transform from one place and/or state to another; (n) a passage from one form, state, style, and/or place to another.

transmit—to send as a signal, provide, furnish, and/or supply.

triangular—pertaining to or having the form of a triangle; three-cornered.

turbomachine—a device in which energy is transferred to and/or from a continuously flowing fluid by dynamic interaction of the fluid with one or more moving and/or rotating blade rows, such as a turbine (e.g., windmill, water wheel, hydroelectric turbine, automotive engine turbocharger, and/or gas turbine, etc.) and/or an impeller (e.g., liquid pump, fan, blower, and/or compressor, etc.).

undercut—a notch, groove, and/or cut beneath.

upon—on occasion of, at which time, during, when, while, and/or immediately or very soon after.

vacuum—a pressure that is significantly lower than atmospheric pressure and/or approaching 0 psia.

vane—any of several usually relatively thin, rigid, flat, and/or sometimes curved surfaces radially mounted along an axis, as a blade in a turbine or a sail on a windmill, that is turned by and/or used to turn a fluid.

variance—a measure of variation of a set of observations defined by a sum of the squares of deviations from a mean, divided by a number of degrees of freedom in the set of observations.

vent—to release from confinement.

version—a particular form or variation of an earlier and/or original type.

via—by way of and/or utilizing.

vibrate—to move back and forth or to and fro, especially rhythmically and/or rapidly.

visual—able to be seen by the eye; visible.

volume—a mass and/or a three-dimensional region that an object and/or substance occupies.

wall—a partition, structure, and/or mass that serves to enclose, divide, separate, segregate, define, and/or protect a volume and/or to support a floor, ceiling, and/or another wall.

wax—such as, for example, injection wax, and/or plastic injection wax, etc weight—a force with which a body is attracted to Earth or another celestial body, equal to the product of the object's mass and the acceleration of gravity; and/or a factor assigned to a number in a computation, such as in determining an average, to make the number's effect on the computation reflect its importance.

where—at, in, to, and/or from what place, source, cause, situation, end, and/or position.

wherein—in regard to which; and; and/or in addition to.

while—for as long as, during the time that, and/or at the same time that.

with respect to—in relation to, compared to, and/or relative to.

within—inside the limits of.

zircon—a hard, brown to colorless mineral consisting of zirconium silicate (ZrSiO4).

zone—a portion of an isogrid containing an array of substantially identically-dimensioned triangular spaces. Within such an array, certain physical properties of the isogrid and/or its ligaments (such as compressive strength, shear strength, elasticity, density, opacity, and/or thermal conductivity, etc.) can be substantially isotropic, that is, substantially equal in all directions.

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects skilled artisans to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential";

any two or more described substances can be mixed, combined, reacted, separated, and/or segregated;

any described characteristics, functions, activities, substances, and/or structural elements can be integrated, segregated, and/or duplicated;

any described activity can be performed manually, semi-automatically, and/or automatically;

any described activity can be repeated, any activity can be performed by multiple entities, and/or any activity can be performed in multiple jurisdictions; and any described characteristic, function, activity, substance, and/or structural element can be specifically excluded, the sequence of activities can vary, and/or the interrelationship of structural elements can vary.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any phrase (i.e., one or more words) appearing in a claim is followed by a drawing element number, that drawing element number is exemplary and non-limiting on claim scope.

No claim of this document is intended to invoke paragraph six of 35 USC 112 unless the precise phrase "means for" is followed by a gerund.

Any information in any material (e.g., a United States patent, United States patent application, book, article, etc.) that has been incorporated by reference herein, is incorporated by reference herein in its entirety to its fullest enabling extent permitted by law yet only to the extent that no conflict exists between such information and the other definitions, statements, and/or drawings set forth herein. In the event of such conflict, including a conflict that would render invalid any claim herein or seeking priority hereto, then any such conflicting information in such material is specifically not incorporated by reference herein.

Within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document.

What is claimed is:

1. A device comprising:
   a ceramic or wax first form comprising:
      a first plurality of surface artifacts that are integral to the first form and that substantially spatially replicates a surface geometry of a first stacked foil mold from which the first form descended, wherein:
         the first plurality of surface artifacts resemble seams but do not extend substantially below a surface of the first form; and
         each surface artifact from the first plurality of surface artifacts geometrically replicates a thickness of a foil of the first stacked foil mold; and
      a first prong that:
         has a predominantly ceramic composition;
         is integral to the first form;
         is structurally configured to form a first hole in a metallic cast product that is cast in a molten state substantially around the first prong;
         is structurally configured to substantially structurally disintegrate due to thermal stresses imparted on the first prong as the metallic cast product cools from a molten state to a solid state; and
         defines a prong longitudinal axis, an intersection of the first form and the first prong defining a fillet that is integral to the first prong and the first form, the fillet defining a first midpoint fillet depth measured in a first plane that contains the prong longitudinal axis, the fillet defining a second midpoint fillet depth measured in a second plane that contains the prong longitudinal axis, the first plane separated from the second plane by a predetermined angle measured perpendicular to the prong longitudinal axis, the fillet comprising one or more surface artifacts from the first plurality of surface artifacts.

2. The device of claim 1, wherein:
the first midpoint fillet depth is measured at a longitudinal midpoint located approximately halfway between a first prong transition that is located where the fillet substantially blends into the first prong in the first plane and a first form transition that is located where the fillet substantially blends into the first form in the first plane.

3. The device of claim 1, wherein:
the second midpoint fillet depth is measured at a longitudinal midpoint located approximately halfway between a second prong transition that is located where the fillet substantially blends into the first prong in the second plane and a second form transition that is located where the fillet substantially blends into the first form in the second plane.

4. The device of claim 1, wherein:
an external surface of the fillet is defined by an external surface of the first form and an exterior surface of the first prong.

5. The device of claim 1, wherein:
the cast product is comprised by at least a portion of an airfoil.

6. The device of claim 1, wherein:
the first form defines at least a portion of a ceramic core.

7. The device of claim 1, wherein:
the first form defines at least a portion of a wax mold.

8. The device of claim 1, wherein:
at least a portion of the first form is structurally configured to be replaced by a molten metallic alloy that, upon solidification, creates at least a portion of the cast product.

9. The device of claim 1, wherein:
the cast product is structurally configured to be cast substantially around the first form.

10. The device of claim 1, wherein:
the cast product is structurally configured to be cast substantially within the form.

11. The device of claim 1, wherein:
the first prong is structurally configured to be destructively removed from the cast product.

12. The device of claim 1, wherein:
the first prong extends outwardly with respect to a predetermined axis of the first form.

13. The device of claim 1, wherein:
the first prong extends inwardly with respect to a predetermined axis of the first form.

14. The device of claim 1, wherein:
the first prong extends outwardly with respect to a predetermined axis of the first form and toward a second prong that extends inwardly from a shell or mold.

15. The device of claim 1, wherein:
the first prong extends inwardly with respect to a predetermined axis of the first form toward a second prong that extends outwardly with respect to a predetermined axis of a core.

16. The device of claim 1, wherein:
the first prong is structurally configured to form a cooling hole in the metallic cast product.

17. The device of claim 1, wherein:
the first prong is structurally configured to form a through hole in the metallic cast product.

18. The device of claim 1, wherein:
the first prong is structurally configured to form a blind hole in the metallic cast product.

19. The device of claim 1, wherein:
the first hole is structurally configured to be finished via a machining technique.

20. The device of claim 1, wherein:
the first prong is structurally configured to extend from the first form toward a predetermined target feature in a wax pattern or shell.

21. The device of claim 1, wherein:
the first hole is structurally configured to extend from a wax pattern toward a predetermined target feature in a core or shell.

22. The device of claim 1, wherein:
the first prong is one of an array of prongs defined by and integral to the first form.

23. The device of claim 1, wherein:
the first prong is coated with a predetermined material.

24. The device of claim 1, wherein:
the first prong is a composite, reinforced structure.

25. The device of claim 1, wherein:
the first prong is consumable.

26. The device of claim 1, wherein:
the first prong defines a first hole entry and/or exit that has a predetermined curvature.

27. The device of claim 1, wherein:
the first prong defines a first hole cross-section that, at a predetermined depth of the first hole, is round.

28. The device of claim 1, wherein:
the first prong defines a first hole cross-section that, at a predetermined depth of the first hole, is not round.

29. The device of claim 1, wherein:
the first prong defines:
   a first prong periphery that has a first predetermined shape as measured in a first predetermined longitudinal cross-sectional plane of the first prong that intersects a first predetermined position along the prong longitudinal axis; and
   a second prong periphery that has a second predetermined shape as measured in a second predetermined longitudinal cross-sectional plane of the first prong that intersects a second predetermined position along the prong longitudinal axis, the first predetermined shape differing from the second predetermined shape.

30. The device of claim 1, wherein:
the first prong defines:
   a first prong cross-sectional area that is measured in a first predetermined longitudinal cross-sectional plane of the first prong that intersects a first predetermined position along the prong longitudinal axis; and
   a second prong cross-sectional area that is measured in a second predetermined longitudinal cross-sectional plane of the first prong that intersects a second predetermined position along the prong longitudinal axis the first prong cross-sectional area differing from the second prong cross-sectional area.

31. The device of claim 1, wherein:
the prong longitudinal axis is not perpendicular to a longitudinal axis of the first form.

32. The device of claim 1, wherein:
the prong longitudinal axis is curved with respect to a longitudinal axis of the first form.

33. The device of claim 1, wherein:
the device defines a counter-sunk and/or moat-like region adjacent an entrance and/or exit of the first hole.

34. The device of claim 1, wherein:
the first prong defines a fiducial on a sidewall of the first hole and/or a bottom of the first hole, the fiducial structurally configured to locate a second hole and/or align a traditional machining technique with the first hole.

35. The device of claim 1, wherein:
the first prong defines a channel connecting the first hole to a second hole, that channel potentially extending between the first hole and the second hole at any position along a length of the first hole.

36. The device of claim 1, wherein:
an outer surface of the first prong defines a stress, fatigue, and/or crack reduction feature.

37. The device of claim 1, wherein:
an outer surface of the first prong defines a predetermined surface geometry.

38. The device of claim 1, wherein:
an outer surface of the first prong defines a predetermined surface roughness.

39. The device of claim 1, wherein:
an outer surface of the first prong is dimpled.

40. The device of claim 1, wherein:
the first prong defines filtering projections.

41. The device of claim 1, wherein:
the first prong defines a filtering feature.

42. The device of claim 1, wherein:
the first prong defines blind pockets.

43. The device of claim 1, wherein:
the first form comprises a rubber liner attached to a metal base, the liner structurally configured to define a shape of the first form, the liner comprising a second plurality of surface artifacts that are integral to the liner and that substantially spatially mirror a surface of a second stacked foil mold from which the liner descended, wherein:
   the second plurality of surface artifacts resemble seams but do not extend substantially below a surface of the liner; and
   each surface artifact from the second plurality of surface artifacts geometrically replicates a thickness of a foil of the second stacked foil mold.

44. The device of claim 1, wherein:
the device defines a plurality of inner cavities in the cast product.

45. The device of claim 1, wherein:
the device defines a pair of cast product inner cavities that are interconnected via one or more passages.

46. The device of claim 1, wherein:
the first plurality of surface artifacts substantially invertedly spatially replicate the surface geometry of the first stacked foil mold.

47. The device of claim 1, wherein:
the first plurality of surface artifacts comprise at least one protruding undercut.

48. The device of claim 1, wherein:
the ceramic composition is structurally configured to undergo a crystal structure change, from one polymorph of a solid material to another polymorph, prior to the metallic cast product being cast around the first prong.

49. The device of claim 1, wherein:
wherein at least a portion of the plurality of surface artifacts resemble substantially linear seams.

50. The device of claim 1, wherein:
wherein at least a portion of the plurality of surface artifacts resemble substantially non-linear seams.

51. A method comprising:
within a first portion of a ceramic or wax investment casting mold and a second portion of the casting mold, at least one of the first portion and the second portion being a first form comprising:
   a first plurality of surface artifacts that are integral to the first form and that substantially spatially replicate a surface geometry of a first stacked foil mold from which the first form descended, wherein:
      the first plurality of surface artifacts resemble seams but do not extend substantially below a surface of the first form; and
      each surface artifact from the first plurality of surface artifacts geometrically replicates a thickness of a foil of the first stacked foil mold; and
   a first prong that:
      has a predominantly ceramic composition;
      is integral to the first form;
      is structurally configured to form a first hole in a metallic cast product that is cast in a molten state substantially around the first prong;
      is structurally configured to substantially structurally disintegrate due to thermal stresses imparted on the first prong as the metallic cast product cools from a molten state to a solid state; and defines a prong longitudinal axis, an intersection of the first form and the first prong defining a fillet that is integral to the first prong and the first form, the fillet defining a first midpoint fillet depth measured in a first plane that contains the prong longitudinal axis, the fillet defining a second midpoint fillet depth measured in a second plane that contains the prong longitudinal axis, the first plane separated from the second plane by a predetermined angle measured perpendicular to the prong longitudinal axis, the fillet comprising one or more surface artifacts from the first plurality of surface artifacts, casting the cast product.

\* \* \* \* \*